United States Patent  (10) Patent No.: US 10,221,294 B2
Nazarpour et al.  (45) Date of Patent: Mar. 5, 2019

(54) METHOD OF COMPOUNDING GRAPHENE WITH NON-CONDUCTIVE PARTICLES AND APPLICATIONS THEREOF

(71) Applicant: NanoXplore Inc., Montréal (CA)

(72) Inventors: Soroush Nazarpour, Montréal (CA); Naiheng Song, Kirkland (CA)

(73) Assignee: NanoXplore Inc., Montreal (CA)

( * ) Notice: Subject to any disclaimer, the term of this patent is extended or adjusted under 35 U.S.C. 154(b) by 0 days.

(21) Appl. No.: 15/877,990

(22) Filed: Jan. 23, 2018

(65) Prior Publication Data

US 2018/0155520 A1 Jun. 7, 2018

Related U.S. Application Data

(63) Continuation of application No. PCT/CA2017/050018, filed on Jan. 6, 2017.

(Continued)

(51) Int. Cl.
*C08K 3/04* (2006.01)
*C09D 7/40* (2018.01)
(Continued)

(52) U.S. Cl.
CPC ............. *C08K 3/042* (2017.05); *B05D 1/00* (2013.01); *B05D 1/045* (2013.01); *B05D 1/06* (2013.01); *B05D 7/02* (2013.01); *C08J 3/128* (2013.01); *C08J 3/203* (2013.01); *C08K 7/00* (2013.01); *C09D 7/70* (2018.01); *C09D 7/80* (2018.01);
(Continued)

(58) Field of Classification Search
CPC .......... C08K 3/042; B05D 1/045; B05D 1/02; B05D 1/04; B05D 1/06
See application file for complete search history.

(56) References Cited

U.S. PATENT DOCUMENTS

2013/0134361 A1* 5/2013 Lee .......................... H01B 1/04
252/503

OTHER PUBLICATIONS

Written Opinion, dated Mar. 28, 2017, for International Patent Application No. PCT/CA2017/050018, filed Jan. 6, 2017.
(Continued)

*Primary Examiner* — Xiao S Zhao
(74) *Attorney, Agent, or Firm* — Cooley LLP

(57) ABSTRACT

Embodiments described herein relate generally to the production of graphene/polymer compounds. In some embodiments, a method for producing graphene/polymer compounds includes compounding graphene nanoflakes with non-conductive polymer hosts via electrospray coating techniques, taking advantage of the highly electrostatically chargeable properties of graphene to de-agglomerate and further exfoliate the graphene nanoflakes in-situ, and providing uniform and well-dispersed graphene nanoflake coating on various non-conductive polymer hosts, such as polymer fine particles, pellets, fibers, fabrics, non-woven, film, and formed articles. In some embodiments, the deposition of the graphene nanoflakes onto the hosts may be performed in combination with other components, such as but not limited to metal oxides and polymers. The method can be a batch or a continuous process, and is suitable for large scale production of graphene coated materials such as graphene/polymer compound, which can be further processed by, for example, extrusion, compression molding, or injection molding, to yield formed articles.

29 Claims, 21 Drawing Sheets

Related U.S. Application Data

(60) Provisional application No. 62/275,591, filed on Jan. 6, 2016.

(51) Int. Cl.
    *C09D 7/80*     (2018.01)
    *B05D 1/04*     (2006.01)
    *B05D 1/06*     (2006.01)
    *B05D 7/02*     (2006.01)
    *C08J 3/12*     (2006.01)
    *C08J 3/20*     (2006.01)
    *C08K 7/00*     (2006.01)
    *B05D 1/00*     (2006.01)
    *B82Y 30/00*     (2011.01)
    *B82Y 40/00*     (2011.01)

(52) U.S. Cl.
CPC ............... *B82Y 30/00* (2013.01); *B82Y 40/00* (2013.01); *C08J 2323/06* (2013.01); *C08J 2375/04* (2013.01); *C08J 2377/06* (2013.01); *C08K 2201/005* (2013.01); *C08K 2201/011* (2013.01); *Y10S 977/753* (2013.01); *Y10S 977/842* (2013.01)

(56) References Cited

OTHER PUBLICATIONS

Mosciatti, T., et al, "A Multifunctional Polymer-Graphene Thin-Film Transistor with Tunable Transport Regimes," ACS Nano, 9(3), 2015.

Choi, K., et al., "Fabrication of graphene-nanoflake/poly(4-vinylphenol) polymer nanocomposite thin film by electrohydrodynamic atomization and its application as flexible resistive switching device," Physica B: Condensed Matter, 2015, 148-155; 475, Amsterdam, Netherlands.

Colonna, S., et a., "Effect of processing conditions on the thermal and electrical conductivity of poly (butylene terephthalate) nanocomposites prepared via ring-opening polymerization," Materials Design, 2017, 124-132, 119.

\* cited by examiner

METHOD OF COMPOUNDING GRAPHENE WITH NON-CONDUCTIVE PARTICLES AND APPLICATIONS THEREOF

CROSS-REFERENCE TO RELATED APPLICATION

This application is a continuation of International Patent Application No. PCT/CA2017/050018, filed Jan. 6, 2017, entitled "METHOD OF COMPOUNDING GRAPHENE WITH NON-CONDUCTIVE PARTICLES AND APPLICATIONS THEREOF," which claims priority to and the benefit of U.S. Provisional Patent Application Ser. No. 62/275,591, filed Jan. 6, 2016, entitled "METHOD OF COMPOUNDING GRAPHENE WITH NON-CONDUCTIVE PARTICLES AND APPLICATIONS THEREOF," the disclosures of which are hereby incorporated by reference in their entirety.

This application is related to PCT Patent Application No. PCT/CA2015/051292, the disclosure of which is hereby incorporated by reference in its entirety.

BACKGROUND

Graphene is a single, one atomic layer of carbon atoms with several exceptional electrical, mechanical, optical, and electrochemical properties, earning it the nickname "the wonder material." To name just a few, it is highly transparent, extremely light and flexible yet robust (high mechanical strength), and an excellent electrical and thermal conductor. In addition, its unique 2D hexagonal lattice structure with atomic-scale thickness and high aspect ratios further differentiates graphene from other types of materials. Such extraordinary properties render graphene and related thinned graphite materials as promising candidates for a diverse set of applications ranging from energy efficient airplanes to extendable electronic papers. For example, graphene based batteries may allow electric cars to drive longer and smart phones to charge faster. Other examples include graphene's ability to filter salt, heavy metals, and oil from water, efficiently convert solar energy, and when used as coatings, prevent steel and aluminum from rusting. In the longer term, thinned crystalline graphite in general promises to give rise to new computational paradigms and revolutionary medical applications, including artificial retinas and brain electrodes.

Although single layer graphene has shown all the desirable properties, making use of these properties remains challenging and requires a very good dispersion of graphene into specific material systems, for example, polymers. Due to the strong van der Waals interaction between layers of graphene, graphene nanoflakes, particularly those having low-defect basal structures, tend to aggregate to give larger particles. Such aggregation significantly lowers the achievable interface interaction between graphene and the polymer matrices, and thus limits to a great extent the achievable properties of graphene/polymer composites.

SUMMARY

Embodiments described herein relate generally to the production of graphene/polymer compounds. In some embodiments, a method for producing graphene/polymer compounds includes compounding graphene nanoflakes with non-conductive polymer hosts via electrospray coating techniques, taking advantage of the highly electrostatically chargeable properties of graphene to de-agglomerate and further exfoliate the graphene nanoflakes in-situ, and providing uniform and well-dispersed graphene nanoflake coating on various non-conductive polymer hosts, such as polymer fine particles, pellets, fibers, fabrics, non-woven, film, and formed articles. In some embodiments, the deposition of the graphene nanoflakes onto the hosts may be performed in combination with other components, such as but not limited to metal oxides and polymers. The method can be a batch or a continuous process, and is suitable for large scale production of graphene coated materials such as graphene/polymer compound, which can be further processed by, for example, extrusion, compression molding, or injection molding, to yield formed articles.

In some embodiments, a method of coating non-conductive polymer particles with graphene nanoflakes includes transferring polymer particles to a bed and electrically grounding the bed. The graphene nanoflakes are transferred to a spray nozzle and the spray nozzle is charged to a high voltage to induce an electrostatic charge in the graphene nanoflakes. The electrostatically charged graphene nanoflakes are transferred from the spray nozzle to the bed, the polymer particles are tumbled while the electrostatically charged nanoflakes are transferred from the spray nozzle to the bed.

DETAILED DESCRIPTION

Figure 1:
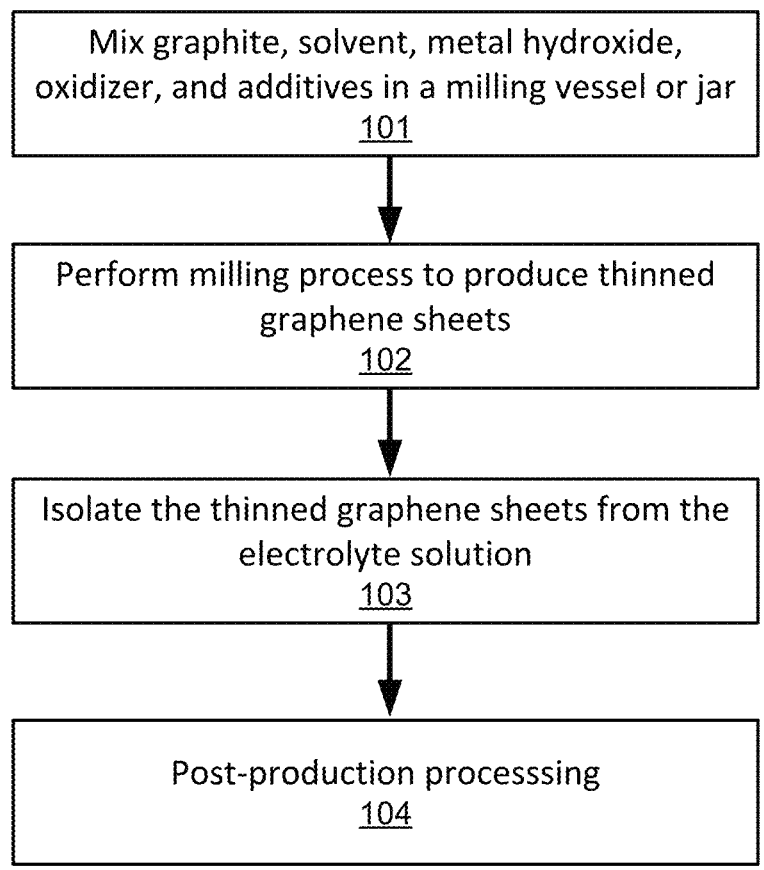
FIG. 1 is a schematic flowchart illustrating a method of producing functionalized graphene, according to an embodiment.
Figure 2B:
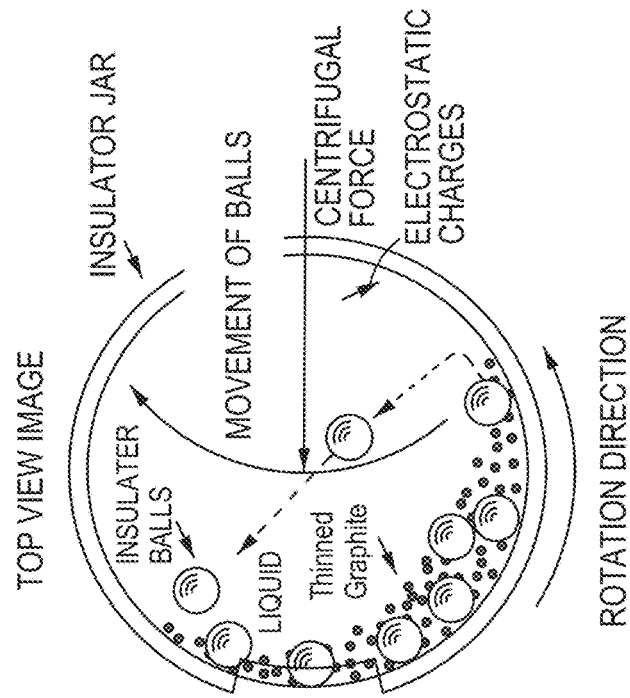
FIGS. 2A and 2B show example schematics of the process of milling in a vessel containing graphite, grinding media and an electrolyte solution, according to an embodiment.
Figure 2A:
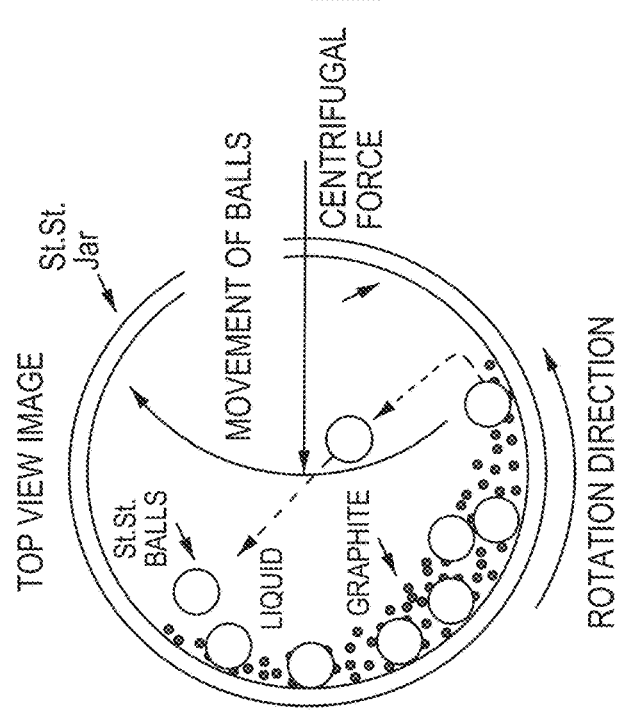

Embodiments described herein relate generally to a method of compounding graphene with non-conductive polymers; in particular, the method relates to electrospray coating of graphene nanoflakes onto a polymer host, for example, such as polymer fine particles, pellets, polymer fibers, continuous plastic fibers, fabrics, non-woven, films, formed articles, and/or the like. In some embodiments, the disclosed method can lead to the production of novel materials with several unique applications. For example, electrically insulating and thermally conductive plastics configured for electronic packaging, enhanced UV protection metal oxide-graphene coating, and mechanically strong structural thermoplastics configured for 3D printing are some of the materials that can be produced as a result of the disclosed method.

Graphene's exceptional properties (e.g., mechanical, thermal, electrical, etc.) coupled with the high surface energy (e.g., about 40-about 60 $mJ/m^2$) and very high surface area (e.g., about 2630 $m^2/g$), suggest graphene can serve as a very effective additive in improving materials' mechanical, electrical, and thermal properties, even at very low loading levels (i.e., additive concentration), for example, less than about 2 wt. %. In some embodiments, one may desire to produce graphene sheets (e.g., exfoliate thick graphene nanoflakes), de-agglomerate stacked graphene sheets, and/or prevent restacking of the de-agglomerated/exfoliated graphene nanoflakes prior to or during the use of graphene materials in the noted applications.

In some embodiments, large scale production methods such as the reduction of graphene oxide obtained from oxidation of graphite, the thermal exfoliation of expanded graphite, the chemo-mechanical exfoliation of graphite, or chemical vapor deposition (CVD) of graphitic materials may be used in producing graphene sheets. Depending on the production method employed, the resulting graphene products may comprise graphene nanoflakes with different number of graphene layers, such as single layer graphene, few layer graphene (e.g., about 2-about 10 layers), and graphene nanoplatelets (>about 10 layers). However, graphene sheets produced from the above-noted techniques may have different drawbacks. For example, although graphene nanoflakes produced from the reduction of graphene oxide can comprise mainly single layer graphene, the nanoflakes may have poor crystalline quality and contain high density of in-plane defects. Furthermore, although graphene oxide can display a favorable dispersion behavior in various matrices, graphene products produced from the reduction of graphene oxide can be difficult to disperse or to manage due to graphene aggregation. As another example, although the thermal exfoliation method can be suitable for large scale production of graphene sheets, there can be difficulties in controlling the sheet sizes as well as the defect contents of the resulting graphene nanoflakes. CVD method can yield high quality graphene, but may not be best suited for large scale production. In comparison, chemo-mechanical exfoliation of graphite, discussed in PCT International Patent Application No. PCT/CA2015/051292, the entire contents of which are incorporated herein by reference in its entirety, can allow the production of low-defect graphene sheets with controllable functionalities.

Methods of Manufacturing Graphene

Embodiments described herein relate generally to large scale synthesis of charged and functionalized graphene sheets, and in particular, at least partially oxidized graphene sheets via a thinning and oxidation process of precursor crystalline graphite. In some embodiments, the oxidation processes disclosed herein can increase the mixability and/or dispersibility of graphene in such products, and in solvents (e.g., polar, non-polar, etc.) in general.

In some embodiments, the processes of the present disclosure include a milling process wherein highly charged (electrostatically), hydroxylated and oxidized thinned graphitic materials are produced starting with a precursor crystalline graphite material. As used herein, the term "thinned graphite" refers to crystalline graphite that has had its thickness reduced to a thickness from about a single layer of graphene to about 1,200 layers, which is roughly equivalent to about 400 nm. As such, single layer graphene sheets, few-layer graphene (FLG) sheets, and in general multi-layer graphene sheets with a number of layers about equal to or less than 1,200 graphene layers can be referred as thinned graphite. As used herein, the term "few-layer graphene" (FLG) refers to crystalline graphite that has a thickness from about 1 graphene layer to about 10 graphene layers In some embodiments, the disclosed processes for thinning precursor crystalline graphite may also reduce the lateral size of the precursor crystalline graphite. In other words, as layers of graphene sheets are removed from crystalline graphite, the in-plane sizes of the resulting thinned product may also be reduced. In such embodiments, the quality of the thinned product and/or the efficiency of the thinning process may be represented by a parameter such as an aspect ratio that incorporates information on the thickness and the lateral size of the thinned graphitic material. For example, one may define the aspect ratio as the ratio of lateral size or in-plane dimension to thickness. Note that other definitions for an aspect ratio are possible and may be adopted based on the circumstances of the situation (e.g., based on geometry of the product, etc.). In general, the aspect ratio provides information on the "efficiency" and/or effectiveness of producing thinned graphite while avoiding or minimizing reduction in lateral sheet size. For example, if a thinned crystalline graphite product has an average lateral dimension of 300 μm and a thickness of 200 nm, the aspect ratio as defined above becomes 300,000/200 (i.e., 1,500). However, a process that reduces the thickness of the same precursor graphite to 100 nm while attaining average lateral dimension of 100 µm (i.e., aspect ratio of 1,000) may be deemed as less efficient, and the end result may be considered as lower quality in comparison to the previous example (even with a thinner end result) since the lateral size is reduced comparatively on a larger scale.

In some embodiments, the precursor and/or the resulting thinned graphite may not have a regular shape that allows for a convenient identification of a measure of a lateral size, or even a thickness. For example, as described herein, the precursor graphite can assume different forms, including rods, fibers, powders, flakes, and/or the like. However, in some embodiments, depending on at least the geometry of the precursor graphite/thinned graphite, generalized definitions of thickness and/or lateral size can be used in characterizing these quantities. In some embodiments, the thickness and/or the in-plane lateral size of crystalline graphite in irregular forms can be characterized by a suitable linear dimension, and/or average of linear dimensions. For example, the thickness can be defined as some suitable length (e.g., height from topmost layer to bottom-most layer of a regularly layered graphite flake, average height if irregularly shaped, etc.) in substantially the same direction as the direction normal to the surfaces of the layered graphene sheets. As another example, the lateral size of crystalline graphite may be defined by some appropriate linear dimension and/or combination of dimensions along the surface of the graphite (e.g., radius, diameter, average of several linear dimensions along the surface, a linear dimension appropriately normalized by shape factors that take the geometrical irregularity of the graphite into consideration, etc.). In any case, suitable linear dimensions that characterize the thickness and the lateral size of crystalline graphite in a reasonable manner may be used in defining the aspect ratio as the ratio of the lateral size to the thickness. For example, if the in-plane shape of the material cannot be modeled by regular geometrical objects relatively accurately, the linear dimension can be expressed by characteristic parameters as is known in the art (e.g., by using shape or form factors).

In some embodiments, the processes disclosed herein for thinning precursor graphitic materials can produce thinned graphite (e.g., single layer, bilayer, few-layer and multi-layer graphene, etc.) of varied thicknesses and lateral sizes. For example, the disclosed thinning process can achieve thinned end products with thickness (as defined above, for example) less than about 1,500 layers (approximately 500 nm), about 400 nm, about 300 nm, about 200 nm, about 100 nm, about 50 nm, about 30 nm, about 10 nm, etc. In some embodiments, the lateral sizes (as defined above, for example) of the thinned end products may be as large as about 500 µm, about 250 µm, about 100 µm, about 1000 nm, about 500 nm, about 250 nm, about 100 nm, about 50 nm, about 10 nm, etc. As such, thinned graphitic products with a wide range of aspect ratios ranging from about 10 nm/500 nm (about 0.2) to about 500 µm/10 nm (about 50,000) can be obtained from the thinning processes disclosed in the instant application.

In some embodiments, as indicated above, the aforementioned milling process brings about not only the thinning of precursor graphite into single, few-layer and/or multi-layer graphene sheets, but also the charging and functionalization of the thinned graphitic material. As will be described below in more details, the thinning and/or functionalization of graphite can be facilitated by oxidizers that may play varied roles based on their oxidation potential. For example, during the thinning process, an oxidizer, in particular a "weak" oxidizer, may be used to facilitate the shearing of sheets of graphene from the precursor graphite. In some embodiments, this can be accomplished when the oxidizer interacts with electrostatic charges in the electrolyte solution comprising the oxidizer and causes the release of atomic oxygen, which then intercalates the layered crystalline graphite and weakens the bonds between the layers. In some embodiments, a "weak" oxidizer refers to a chemical agent with an oxidation potential less than about 1.5V, about 1.25V, about 1.0V, about 0.75V, about 0.5V, about 0.25V, about 0V, about −1V, about −2V, about −3V, etc.

In some embodiments, during the milling process, a "strong" oxidizer may be used to facilitate the conversion of hydroxyls bonded to the edges of a hydroxylated graphitic material into carbonyl groups. In other words, the strong oxidizer leads to the at least partial oxidization of graphene sheets where hydrogen atoms from the hydroxyls at the hydroxylated edges are released, leaving behind oxygen doubly bonded to a carbon atom, i.e., partially oxidized graphene sheets. In most embodiments, the oxidizers capable of facilitating the conversion of hydroxyls to carbonyls have strong oxidation potentials, hence the term "strong" oxidizer. In some embodiments, a "strong" oxidizer refers to a chemical agent with an oxidation potential greater than about 1.5V, about 1.6V, about 1.75V, about 1.9V, about 2.25V, about 2.5V, about 2.75V, about 3V, etc.

In some embodiments, methods and systems for producing electrostatically charged and hydroxylated graphene sheets from crystalline precursor graphite are disclosed. In some of these embodiments, the methods include a process where the crystalline graphite (e.g., flake graphite (FG) powder) can be thinned to single, few or multi-layer graphene sheets with charged edges that facilitate the hydroxylation and/or carbonyl-ation of the edges of the graphene sheets. In some embodiments, the first step of the process comprises combining large crystalline precursor graphite with electrolyte slurry into a grinding vessel or jar such as, but not limited to, an attritor or attritor ball mill. In some embodiments, the electrolyte slurry includes at least a metal hydroxide (MH) salt and an aqueous solution comprising a polar solvent (e.g., water, ethanol, 1-propanol), a weak oxidizer and a surfactant. The grinding vessel and/or the associated grinding media may be chosen based on the amount of electrostatic charge one desires to generate during the disclosed processes; as such, a selection of the grinding vessel and/or the associated grinding media can be used as a control over the charging level of the thinned graphene sheets. For example, vessels or jars made from insulating material such as Alumina or Zirconia accompanied with same/similar type of grinding balls generate higher electrostatic charges than stainless steel jars and balls. Another parameter that can be used to control the generation and amount of the electrostatic charge to be produced during the disclosed milling processes is the rotation speed. For example, medium rotation speed of the grinding vessel can introduce electrostatic charges on and within the electrolyte, resulting in the ionization of the MH salt.

In some embodiments, the hydroxide ions released into the electrolyte slurry from the MH salt can diffuse into the interlayer spacing of the layered crystalline precursor graphite, i.e., the hydroxide ions intercalate graphite so as to cause the formation of n-stage intercalated graphite. In such embodiments, n can be any one of natural numbers less than the number of graphene layers in the crystalline precursor graphite. For example, n can be 1, 2, 3, 4, 5, etc. In some embodiments, the n-stage intercalated graphite can be a combination of different stage intercalated graphite. For example, the hydroxide ions can intercalate graphite so as to cause the formation of 1-stage and 2-stage intercalated graphite, and/or the like. In some embodiments, this may facilitate the exfoliation of layers of graphene sheets from the precursor graphite by the shearing forces induced during the rotation of the grinding vessel or jar. In some embodiments, the resulting graphene sheets tend to maintain the initial lateral size of precursor graphite while their thickness may be dramatically lowered, in particular in comparison to the thickness of the initial precursor graphite. In some embodiments, the resulting graphene product (which may include thinned graphitic materials such as, but not limited to, single, few and multi-layer graphene sheets, etc.) may be post-processed (e.g., filtered, washed, dried, and/or the like) so as to at least remove extraneous by-products. In some embodiments, at the end of the milling process, the resulting graphene product may appear to be black, and may exhibit a fluffy structure. Further, the resulting product may be electrostatically highly charged and contain hydroxyl molecules, and the electrostatic charges and the hydroxyl molecules may appear more at the edges of the resulting graphene sheets than on the surface (e.g., towards the center).

In some embodiments, the first step of the process comprises the thinning precursor crystalline graphite in the presence of an electrolyte solution. As used herein, the term "crystalline graphite" or "precursor crystalline graphite" refers to graphite based material of a crystalline structure with a size configured to allow milling in a grinding or milling vessel or jar. For example, the crystalline graphite can be layered graphene sheets with or without defects, such defects comprising vacancies, interstitials, line defects, etc. The crystalline graphite may come in diverse forms, such as but not limited to ordered graphite including natural crystalline graphite, pyrolytic graphite (e.g., highly ordered pyrolytic graphite (HOPG)), synthetic graphite, graphite fiber, graphite rods, graphite minerals, graphite powder, flake graphite, any graphitic material modified physically and/or chemically to be crystalline, and/or the like. In some embodiments, the crystalline graphite can be graphite oxide. The lateral or in-plane size as well as the thickness of the ordered graphite can assume a wide range of values. For example, using an appropriate measure to quantify the lateral size of the ordered graphite as discussed above (e.g., mean lateral sizes, diameter, etc., depending on the shape, for example), the lateral sheet size of the ordered graphite can range from about 10 nm to about 500 µm. The thickness of the graphite can be as large as desired as long as its size may not interfere with the milling or thinning processes.

In some embodiments, the electrolyte solution in which the milling process takes place comprises polar solvents. An example of a polar solvent may be purified water such as, but not limited to, double distilled deionized water. Other examples include propanol, butanol, acetic acid, ethanol, methanol, formic acid, and/or the like. In some embodiments, some of these solvents may also be used for other purposes during the milling process. For example, ethanol may be used as a de-foaming agent.

In some embodiments, during the milling process, a weak oxidizer may be used to interact with hydroxyl ions to generate atomic oxygen that can intercalate graphite and weaken the interlayer van der Waals bonds. Owing to its conductive characteristics, the weak oxidizer can be used as a dissipating agent for the electrostatic charges produced during the milling process. That is, the weak oxidizer may be configured to assist with the dissipation of the electro-static charges throughout the electrolyte solution. As used herein, a "weak" oxidizer refers to a chemical agent with an oxidation potential less than about 1.5V. Examples of a weak oxidizer include diluted hydrogen peroxide, chromate, chlorate, perchlorate, and/or the like. In this context, a diluted oxidizer may mean an oxidizer that contains about 30% by weight of the oxidizing agent. For example, a diluted weak hydrogen peroxide oxidizer has about 30% by weight of the oxidizing agent hydrogen peroxide. In some embodiments, the diluted oxidizer may contain from about 10% to about 50%, from about 15% to about 45%, from about 20% to about 40%, from about 25% to about 35%, and/or the like of the oxidizing agent by weight.

In some embodiments, a metal hydroxide (MH) salt configured to interact with electrostatic charges to produce metal and hydroxide ions can be added into the grinding vessel or jar of the process disclosed herein. As discussed above, the hydroxyl ions may further interact with electrostatic charges to generate atomic oxygen that can intercalate crystalline graphite and weaken the interlayer van der Waals bonds so as to facilitate the shearing of the graphene sheets of the graphite. In some embodiments, the hydroxide ions can also diffuse into the interlayer spacing of the layered crystalline precursor graphite to intercalate graphite and facilitate the exfoliation of graphene sheets by the shearing forces generated during the rotation of the grinding vessel or jar. In some embodiments, the metal hydroxide salt can be formed from a combination of a hydroxyl ion and a metal selected from alkali metals, alkaline earth metals, boron group elements, etc. Examples of metal hydroxide salts that can be used for the disclosed processes include hydroxides of Li, Na, K, Cs, Be, Mg, Ca, Sr, Ba, B, Al, Ga, In, Cs, Rb, Ti, mixtures thereof, and/or the like. In some embodiments, the amount of metal hydroxide salt to be used in the disclosed processes can assume a wide range of values. For example, in some embodiments, the amount of metal hydroxide salt may range from about 1% to about 30% by weight about X % to about Y % by volume of the electrolyte solution. In some embodiments, the amount may range from about 5% to about 25%, from about 10% to about 20%, from about 14% to about 16% by weight, etc. In some embodiments, the amount may be any amount equal to or less than the maximum amount that is soluble in the electrolyte solution. In some embodiments, in particular for the purpose of doping resulting graphene sheets with metal particles, the amount of metal hydroxide salt can be increased to about 90% of the solution by volume.

In some embodiments, the type of MH salt that may be used in the process may depend on the desired production yield of the process to reduce the precursor crystalline graphite into thinned and charged graphene sheets. In some embodiments, production yield may be defined as the proportion of precursor graphitic material that has been reduced to thinned graphite of a defined number of graphene sheets or less. In some embodiments, the production yield of the process may vary based on the type of metal that is part of the MH salt. For example, in some embodiments, for a high production yield of greater than about 60% (i.e., greater than about 60% of the precursor graphite by weight is converted into thinned graphene of about 10 layers as a result of the process), the metal that is part of the MH salt may be a member of the alkali and/or alkaline earth metals, comprising Li, Na, K, Cs, Be, Mg, Ca, Sr and Ba. In some embodiments, for a low production yield of less than about 60%, the metal may be a member of the boron group elements, comprising B, Al, Ga, In, and Ti. In some embodiments, the MH salt used in the milling or grinding processes disclosed herein may be a single MH salt comprising a metal and a hydroxide ion, and in some embodiments, the MH salt may be a mixture of any of the above-identified metal hydroxide salts.

In some embodiments, surfactants can be included in the process so as to avoid or minimize clamping of the end products of the process. Further, surfactants may increase the conductivity of the mixture in the grinding vessel, allowing for an increased diffusion of the hydroxyl ions and thereby contributing to the exfoliation of graphene layers from the crystalline graphite as discussed above. In addition, surfactants may be used to facilitate the mixing of polar and non-polar solvents that in general are adverse to mixing. Further, surfactants may also be used to facilitate contact between an ingredient that is adverse to mixing with a given solvent and the solvent. For example, surfactants may be used to facilitate contact between hydrophobic graphite materials and water. Examples of surfactants that can be used for such purpose during process comprise sodium dodecyl sulfate (SDS), sodium dodecyl benzene sulfonate, pyridinium (PY+), thionin acetate salt, triton, mixtures thereof, and/or the like.

In some embodiments, the concentration of surfactants to be used during the milling processes can be determined based on the desire to maintain balance between the thinning of the crystalline graphite and the reduction in its lateral size. As discussed above, in some embodiments, surfactants enhance the shearing force on crystalline graphite and facilitate the thinning of the crystalline graphite. On the other hand, a large amount of surfactants (e.g., more than the amount used to avoid or minimize agglomeration of crystalline graphite) can lead to reduction in lateral size, which may be undesirable in some circumstances. Accordingly, in some embodiments, an average concentration of between about 1 µMolar and about 200 µMolar of surfactants can be considered sufficient during the thinning and charging processes of precursor graphite. In some embodiments, the average concentration may range from about 5 µMolar to about 150 µMolar, from about 10 µMolar to about 100 µMolar, from about 10 µMolar to about 50 µMolar, from about 50 µMolar to about 100 µMolar, and/or the like.

In some embodiments, the electrolyte solution used for the milling process can have a very conductive and alkaline environment. For example, the pH level may range from almost neutral to very strong basic. In some embodiments, the pH level may range from about 8 to about 14, from about 9 to about 14, from about 9 to about 11, from about 12 to about 14, and/or the like. The alkalinity may follow as a result of the small ionization potential of MH salt upon dissolving in the solvent(s) of the electrolyte solution.

In some embodiments, the disclosed grinding or milling processes can be carried out in any type of grinding or milling system that comprises a vessel and allows for the shearing, exfoliation, charging, hydroxylation, etc., of the crystalline precursor graphite. Examples of such a system that can be used for the process include milling vessels such as but not limited to ball mills, rod mills, pebble mills, autogenous mills, semi-autogenous mills, roller mills (e.g., jar roller mills, ring mills, frictional-ball mills, etc.), attritors, planetary mills, jet mills, aerodynamic mills, shear mixers, and/or the like. In some embodiments, the mill jars or vessels can be made from conductive materials, insulators and/or semi-conductors, including ceramic materials, alumina, stainless steel, and/or zirconia, and can also be lined with materials such as polyurethane, rubber, etc. In some embodiments, the vessels may include grinding media for aiding in the grinding/shearing of precursor materials such as graphite. In some embodiments, the grinding media can be made from the same type of materials as the vessel or jar in which the grinding media are being used. As such, for example, the vessels and/or the grinding media may be electrically conductive, and comprise materials such as stainless steel, metals and/or alloys (e.g., tungsten carbide). In some embodiments, the vessels and/or the grinding media may be coated with electrically conductive material. In general, the vessels and/or the grinding media may be configured to conduct electric charges. For example, the grinding media can be made from alumina, zirconia, stainless steel, etc. In some embodiments, the grinding media may assume different forms. For example, the grinding media can be at least substantially a ball (hence the common term "ball milling"), at least substantially a cylinder, at least substantially a rod, and in fact any shape capable of aiding in the grinding/shearing of precursor materials. As used herein, the term "grinding media" or "milling balls" refer to any grinder that can be used in the exfoliation and thinning of crystalline graphite in ball milling jars. Even though the common nomenclature "milling balls" is used, the grinding media or the milling balls are not limited to a particular geometry, and can have any desired property such as shape, size, composition, etc.

In some embodiments, with reference to FIG. 1, crystalline graphite, a solvent (e.g., polar), grinding media, a MH salt, a weak oxidizer and a surfactant can be added into a milling vessel to commence the milling process, e.g., step 101. For example, large flake size graphite powder, water, hydrogen peroxide, a metal hydroxide salt such as potassium hydroxide (KOH), and a surfactant such as SDS may be added into a milling vessel. In some embodiments, electrolyte mixtures such as the one in the preceding example may be placed into a milling vessel or jar made from electrically conductive materials such as stainless steel, metal or alloys, and milled or rotated for a period of time and at a speed of rotation configured to generate electrostatic charges in the electrolyte mixture, e.g., step 102. In some embodiments, the speed of the rotation may be configured to reduce the initial thickness of the graphite without substantially affecting its lateral size. For example, the stronger mechanical interaction between the grinding media and the crystalline graphite that could result as a result of higher milling vessel rotational speed can reduce not only the thickness of the crystalline graphite, but also its lateral size. Accordingly, during the milling process, the milling speed can range from about 10 rotations per minute (rpm) to about 500 rpm. In some embodiments, the milling speed can range from about 10 rpm to about 300 rpm, from about 10 rpm to about 250 rpm, from about 10 rpm to about 150 rpm, from about 10 rpm to about 100 rpm, from about 50 rpm to about 300 rpm, from about 150 rpm to about 250 rpm, from about 200 rpm to about 250 rpm, and/or the like.

In some embodiments, the number and/or sizes of grinding media in the milling vessel or jar can depend on milling process related factors such as but not limited to the running time, the rotational speed, amount/size of the crystalline graphite, average size of the grinding media, and/or the like. For example, for a given amount of crystalline graphite, there can be some milling ball sizes (conversely number of milling balls) that can be particularly beneficial in effecting a more efficient shearing of crystalline graphite layers depending on the speed and the length of the ball milling process. In some embodiments, the grinding media may be small sized balls and their amount may be chosen based on the amount of crystalline graphite to be treated. For example, the amount of the grinding media may be chosen so that during the milling process, the weight proportion of grinding media to crystalline graphite may be in the range of from about 5:1 to about 20:1. In some embodiments, the proportion may be in the range of from about 7:1 to about 15:1, from about 9:1 to about 12:1, about 10:1, and/or the like. In such embodiments, the average size of the grinding media (e.g., balls) may be in the range of from about 3 mm to about 20 mm, from about 5 mm to about 15 mm, from about 8 mm to about 12 mm, and/or the like.

In some embodiments, the duration of the milling process to reduce the thickness of the precursor graphite and arrive at hydroxylated thinned graphite or graphene sheets may range from about from about 2 hours to about 24 hours. In some embodiments, the duration may range from about 2 hours to about 12 hours, from about 2 hours to about 6 hours, from about 2 hours to about 4 hours, and/or the like.

In some embodiments, the rotation during the process may generate a shearing force by the grinding media that may be configured to provide enough energy to the electrostatic charges in the electrolyte solution to react with the salts (which may be polarized) in the solution. In some embodiments, the reaction between the electrostatic charges and the MH salt may generate atomic oxygen. An additional mechanism for the generation of atomic oxygen in the electrolyte mixture can be through the interaction of the weak oxidizer with the hydroxyl ions that may be present in the mixture (from the MH salt, for example). In such embodiments, the weak oxidizer may interact with the hydroxyl ions to release atomic oxygen that may also be used for the exfoliation of the graphite. For example, in some embodiments, the generated and/or released atomic oxygen may diffuse in between layers of the crystalline graphite and increase the in-plane separation. When the in-plane distance passes beyond a certain distance, in some embodiments, inter-planar bonds (covalent, van der Waals, etc.) of graphite may become weak enough that a gentle shearing force may exfoliate the layers from the crystalline graphite. In some embodiments, hydroxyl anions in the electrolyte may also diffuse in between layers of graphite and weaken the inter-layer bonding. In some embodiments, the solvent may also penetrate between layers of the ordered graphite and weaken the forces that hold the layers together, thereby contributing to the thinning of the crystalline graphite during the milling process.

In some embodiments, the milling process may be interrupted every so often to allow the escape of gas for various reasons (e.g., safety). For example, in some embodiments, the milling process may be stopped every 30 minutes to evacuate gas by-products that are produced during the rotation/milling of the milling vessel. In some embodiments, the process of milling may also be performed in a manner designed to avoid evaporation of solvents such as water from the aqueous electrolyte solution. For example, milling vessels or jars used in the milling processes may be kept at a temperature formulated to avoid evaporation of the solvents, an example being room temperature.

In some embodiments, the resulting product of the milling may appear black and possess a fluffy structure. This resulting product may be post-processed to at least remove extraneous by-products or residues such as, but not limited to, metallic ions, surfactants, metal salts, etc. For example, the product may be removed from the milling vessel or jar and washed with one or more of water, hydrochloric acid (HCl), ethanol, and/or the like, e.g., step 103 of FIG. 1. In some embodiments, the washing may be followed by vacuum filtration and vacuum drying. The resulting product can be single or thinned few layer graphene (FLG) sheets that are highly charged and hydroxylated mainly at the edges, in some embodiments.

In some embodiments, the graphene sheets from the first step of the milling process may include graphene or thinned graphite materials with lateral sizes that are comparable to the precursor graphite but with thickness of few graphene layers, including single layer graphene sheet. For example, the lateral sheet size of the graphene sheets may be about 500 µm while the number of layers may be between about 10 and about 100 graphene layers, less than about 10 graphene layers, less than about 3 graphene layers, and a single graphene sheet. In some embodiments, the graphene sheets may be highly electrostatically charged and may contain hydroxyl molecules that reside mostly on the edges rather than towards the center of the surfaces of the graphene sheets. As such, this may lead to the selective functionalization of the edges in comparison to the entire surfaces of the thinned graphene sheets.

At least some embodiments of the milling process have been employed experimentally to reduce the thickness of precursor crystalline graphite and produce highly electrostatically charged, hydroxylated graphene sheets. In some embodiments of the experimental results, at least some of these graphene sheets can be conveniently classified into the following classes or grades:

Grade A: A few-layer graphene powder of about 3 to 4 graphene layers and lateral size (e.g., flake diameter) of about 5 µm to 20 µm. These graphene sheets have been found to exhibit highly activated edges and low defect density.

Grade B: A few-layer graphene powder of about 2 to 3 graphene layers and lateral size (e.g., flake diameter) of about 0.5 µm to 5 µm. These graphene sheets have been found to exhibit highly activated edges and low defects.

Grade C: A few-layer graphene powder with similar properties as Grade A, but with moderately activated edges.

Grade D: A few-layer graphene powder with similar properties as Grade B, but with moderately activated edges.

Figure 3:
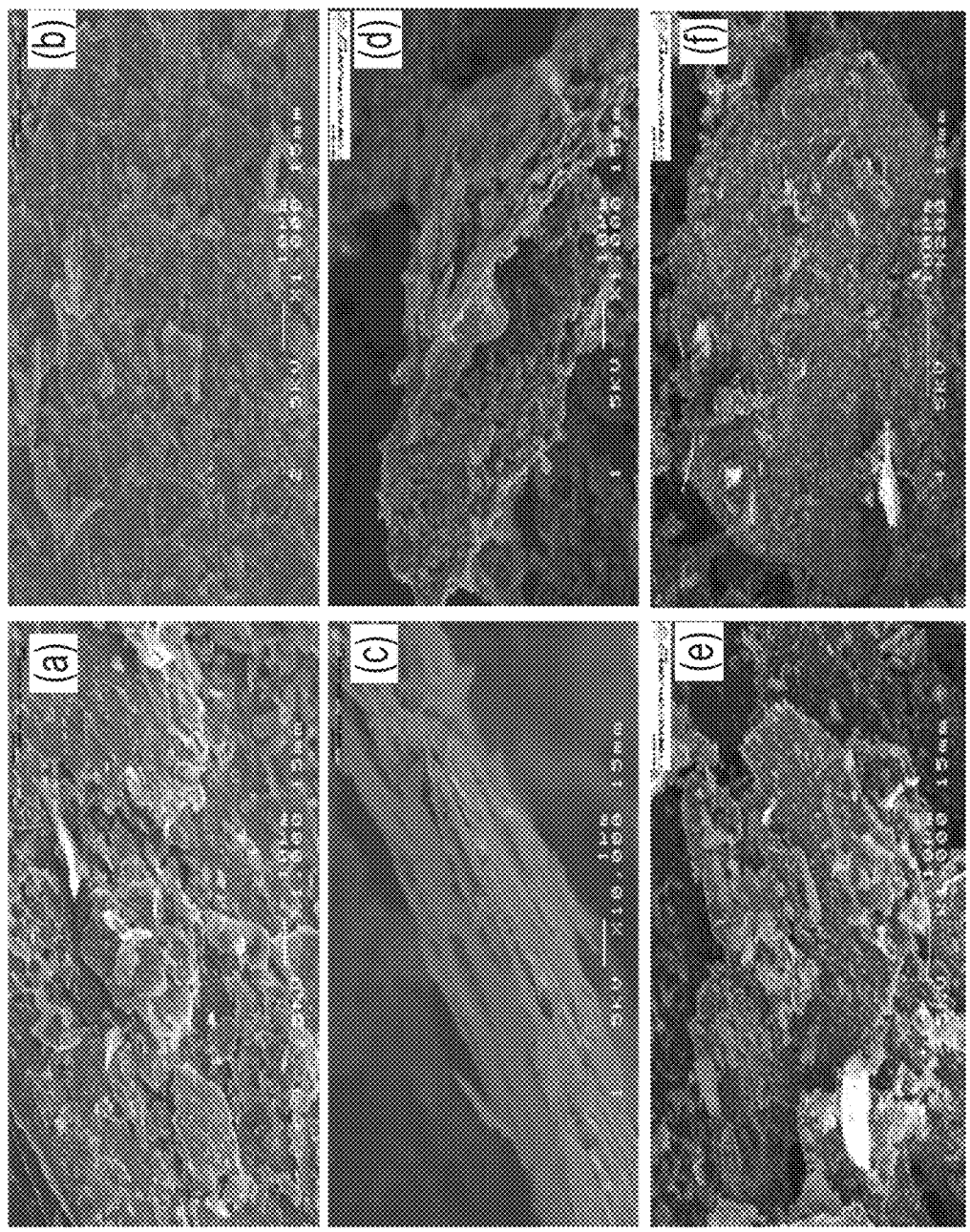
FIGS. 3A-3F are a series of SEM micrographs of a wide variety of few-layer graphene, according to an embodiment.
Figure 4B:
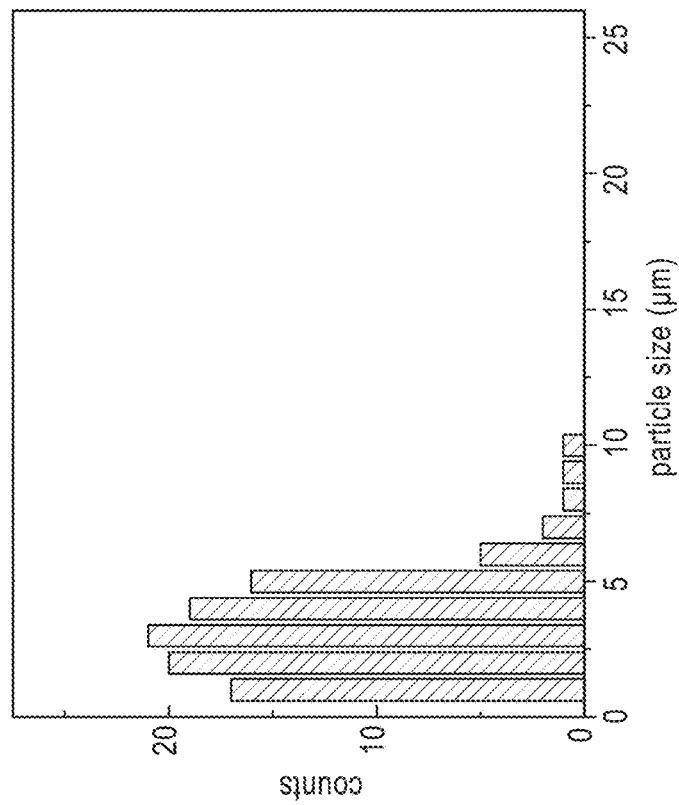
FIGS. 4A and 4B are plots of the lateral size distribution of graphene-based particles that comprise few-layer graphene samples, according to an embodiment.
Figure 4A:
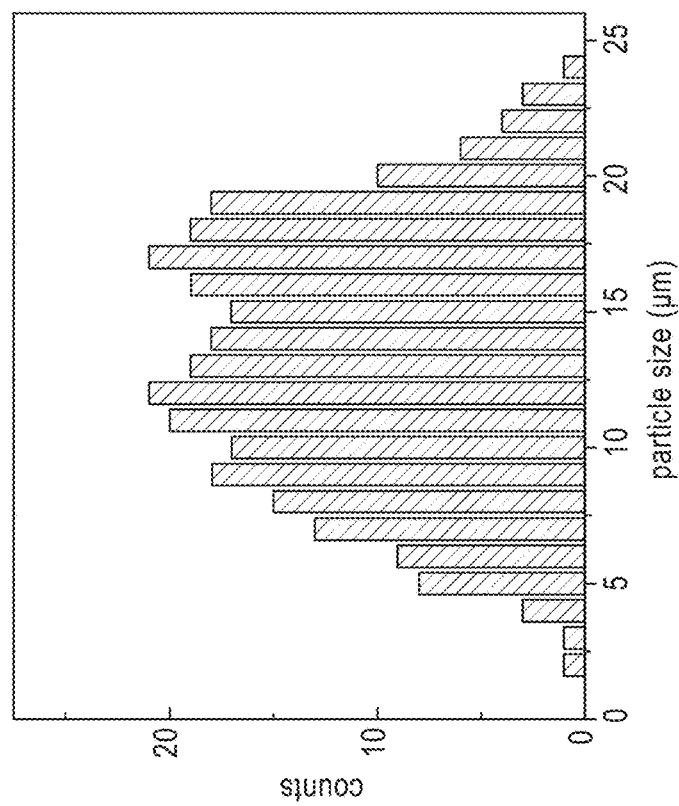

In some embodiments, the lateral sizes and the thicknesses of these various grades may be obtained from any number of experimental techniques. For example, FIG. 3 shows example scanning electron microscopy (SEM) images of thinned graphene products that belong in Grade A (FIG. 3A), Grade B (FIG. 3B), Grade C (FIG. 3C), and Grade D (FIG. 3D). From an analysis of the SEM images, in some embodiments, grades A and C have been found to include particles or flakes ranging in lateral size from about 5 µm to about 20 µm (FIG. 4A), and grades B and D include particles ranging in lateral size from about 0.5 µm to about 5 µm (FIG. 4B). In some embodiments, in addition to size information, the analysis may also reveal the distribution of structures of the graphene sheets from the first step. For example, Grade B (FIG. 3B) shows thin layered structures stacked together.

Figure 5:
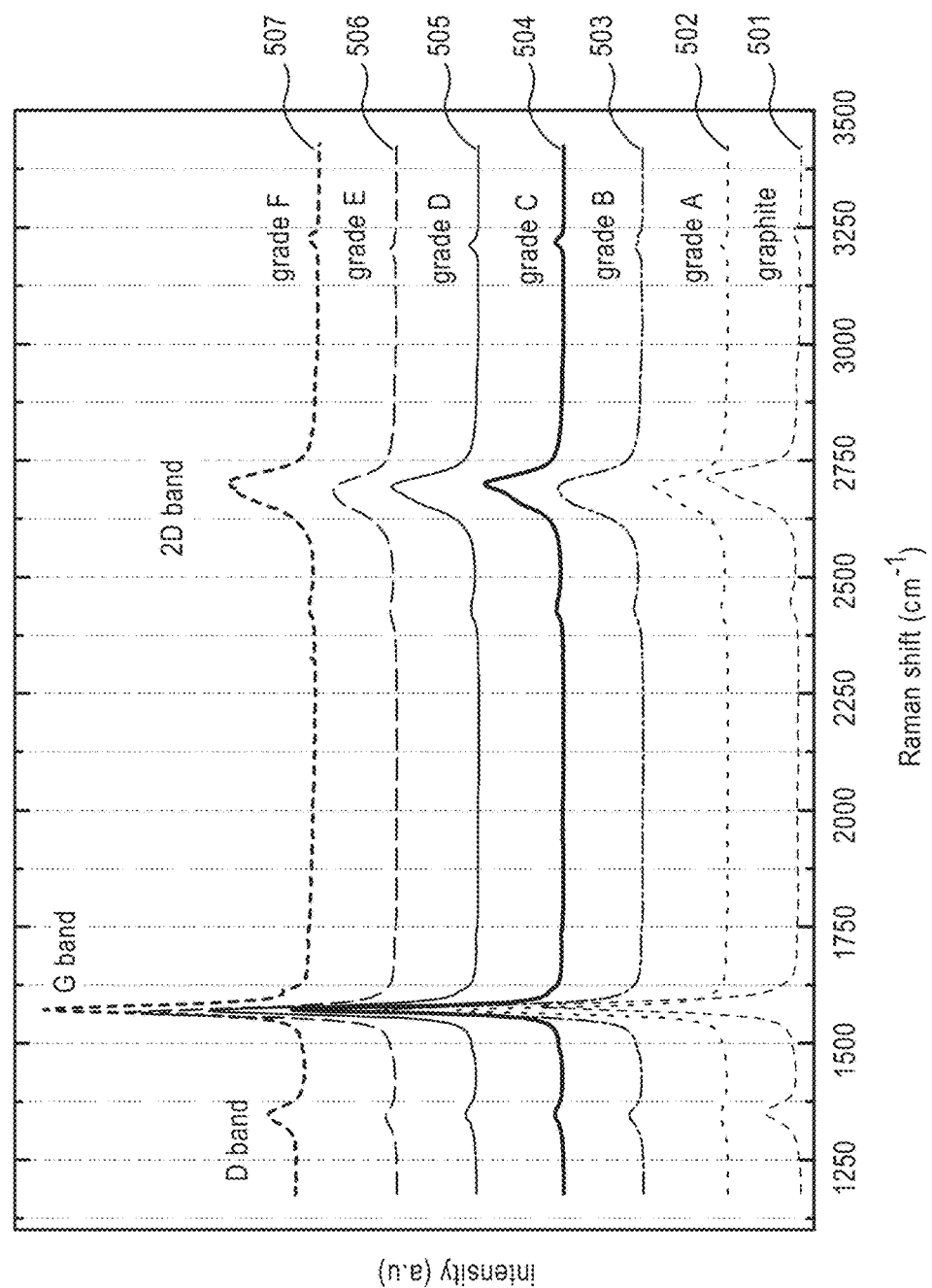
FIG. 5 is a plot of Raman spectra for a series of different few-layer graphene sheets, and bulk graphite, according to an embodiment.

With respect to thickness and defect density of the resulting products of the milling process, in some embodiments, Raman spectroscopy can be used to characterize these properties. In some embodiments, visible light (e.g., 532 nm wavelength light corresponding to 2.33 eV energy) may be used to obtain Raman spectra for bulk crystalline graphite, Grade A few layer graphene (FLG) 502, Grade B FLG 503, Grade C FLG 504 and Grade D FLG 505, shown in FIG. 5. In FIG. 5, the Raman spectra for all the grades show peaks that are the result of in-plane vibrational modes caused by excitations due to the laser used for the spectroscopy. These peaks or bands include the primary in-plane mode of the so-called G band around wavenumber 1580 cm$^{-1}$, a different in-plane vibration mode of the so-called D band around wavenumber 1300 cm$^{-1}$, and a second-order overtone of the D band, the so-called 2D band around wavenumber 2700 cm$^{-1}$. Analysis of the D peaks as discussed in Phys. Rev. Lett., 97, 187401 (2006) and Journal of Physics: Conference Series 109 (2008) 012008, the entire contents of both of which are incorporated herein by reference in its entireties, can provide information on the thicknesses of the graphene sheets of the different grades resulting from the disclosed milling processes. In some embodiments, one may also use the techniques disclosed in J. Raman Spectrosc. 2009, 40, 1791-1796, the entire contents of which is incorporated herein by reference in its entirety, to analyze the G peaks and evaluate the number of layers in the graphene sheets. Further, in some embodiments, an analysis of the D peaks and the G band with respect to each other may reveal information on defect density of the graphene sheets. For example, the ratio of the intensity at the G band to the intensity at the D band may serve as a parameter for characterizing defect density. For example, a large ratio may indicate the presence of little or no defects in the resulting graphene products while a small value of the ratio indicates large defect presence. From the results of the Raman spectroscopy (FIG. 5), the average value of the ratio for the graphene sheets of Grades A, B, C, and D can be calculated to be about 20, a large value indicating low numbers of defects in the resulting graphene sheets of the first step of the process (and further indicating that the graphene sheets have large sizes).

Figure 6:
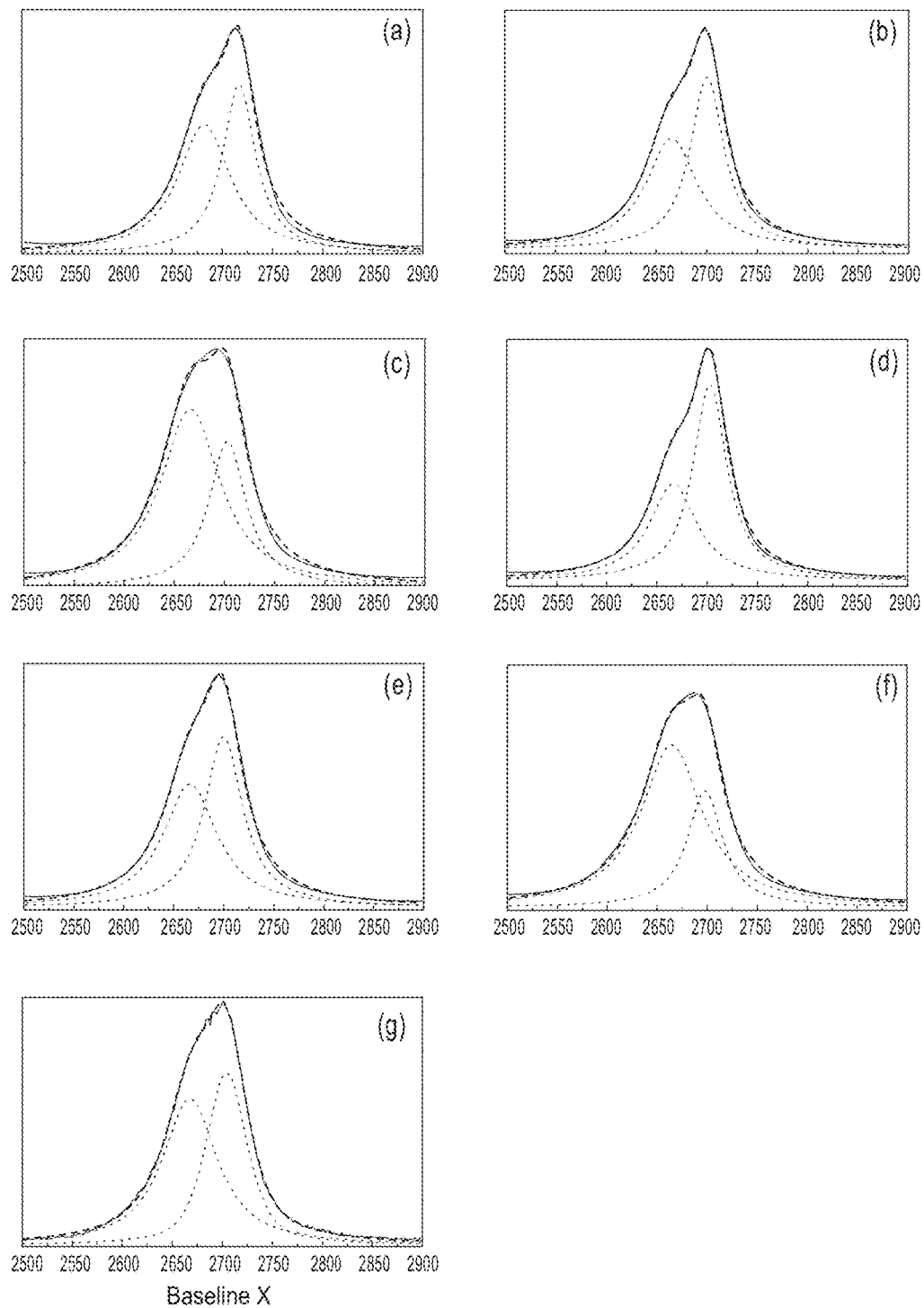
FIGS. 6A-6G are plots showing the two peak deconvolution of the Raman spectra of different few-layer graphene sheets and bulk graphite indicating the presence of a plurality of graphene layers, according to an embodiment.
Figure 7B:
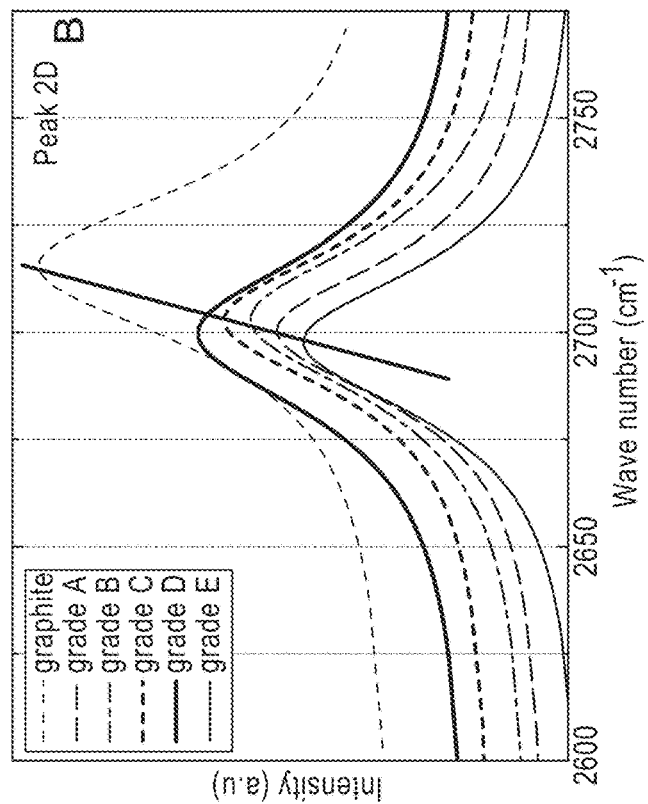
FIGS. 7A and 7B are plots showing the shift of the 2D band peak as a function of the thickness of few-layer graphene samples, according to an embodiment.
Figure 7A:
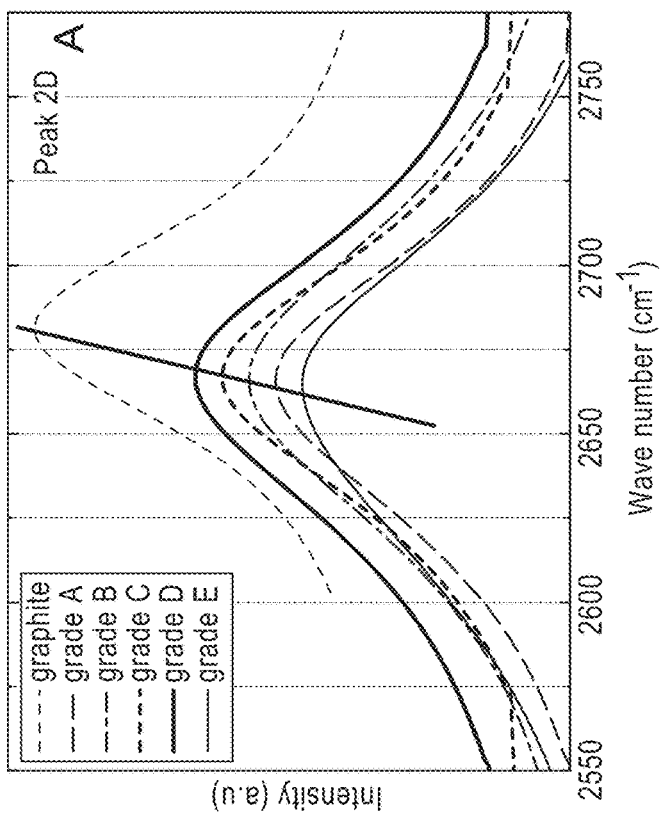
Figure 8:
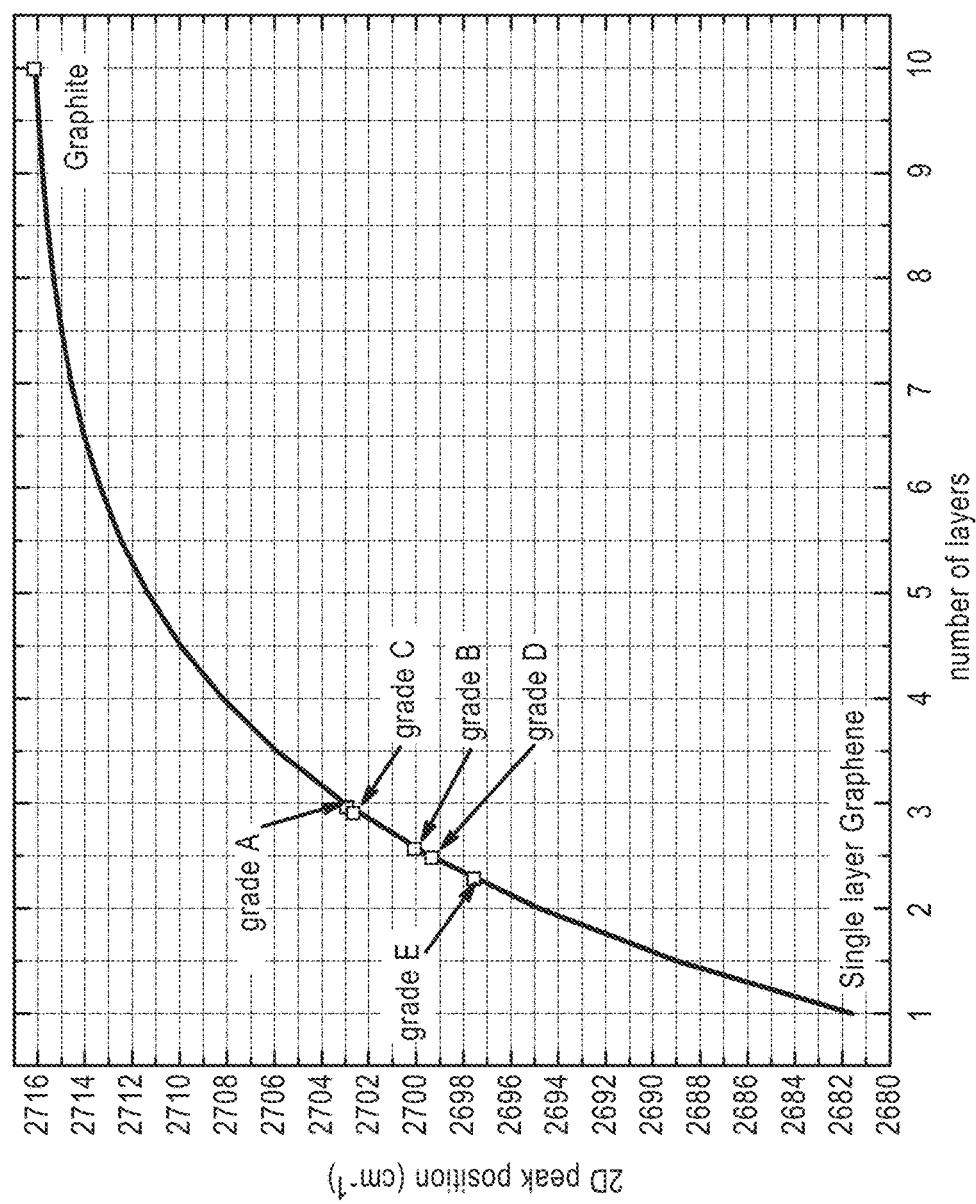
FIG. 8 is alternative plot providing a compact view of the number of layers in few-layer graphene samples, according to an embodiment.

With respect to the analysis of the D peaks, in some embodiments, changes in shape, width, and position of the 2D peaks of the Raman spectra may be used to identify the thicknesses of the grades of graphene sheets being investigated. Using the techniques discussed in the above noted Journal of Physics article (Journal of Physics: Conference Series 109 (2008) 012008), a two peaks deconvolution using Lorentzian functions can be chosen, as shown in FIG. 6, indicating that the number of layers exceeded two. In some embodiments, an analytical comparison of the 2D peaks amongst the different grade graphene sheets may reveal that the 2D peak shifts from a higher wavenumber for crystalline graphite with large number of graphene sheets to a lower wavenumber for few-layer graphene such as the thinned products of Grade D, as shown in FIGS. 7A-B. In some embodiments, one may compare the 2D peak positions for the different grades with the data provided in Chem. Comm., 2011, 47, 9408-9410, the entire contents of which is incorporated herein by reference in its entirety, to establish the number of layers in the graphene sheets of Grades A-D and bulk crystalline graphite. FIG. 8 provides a compact view of the number of layers of the graphene sheets of Grades A-D and bulk crystalline graphite in relation to the 2D peak positions. A tabulation of the 2D peaks and the number of layers for each grade is given in the table below:

| Sample | 2D$_A$ peak position | 2D$_B$ peak position | Number of layers |
|---|---|---|---|
| Graphite | 2682.03 cm$^{-1}$ | 2716.67 cm$^{-1}$ | >=10 |
| Grade A | 2665.26 cm$^{-1}$ | 2700.34 cm$^{-1}$ | 2 to 3 |
| Grade B | 2666.09 cm$^{-1}$ | 2703.01 cm$^{-1}$ | 4 to 5 |
| Grade C | 2666.28 cm$^{-1}$ | 2702.82 cm$^{-1}$ | 2 to 3 |
| Grade D | 2666.37 cm$^{-1}$ | 2699.72 cm$^{-1}$ | 4 to 5 |

Figure 9:
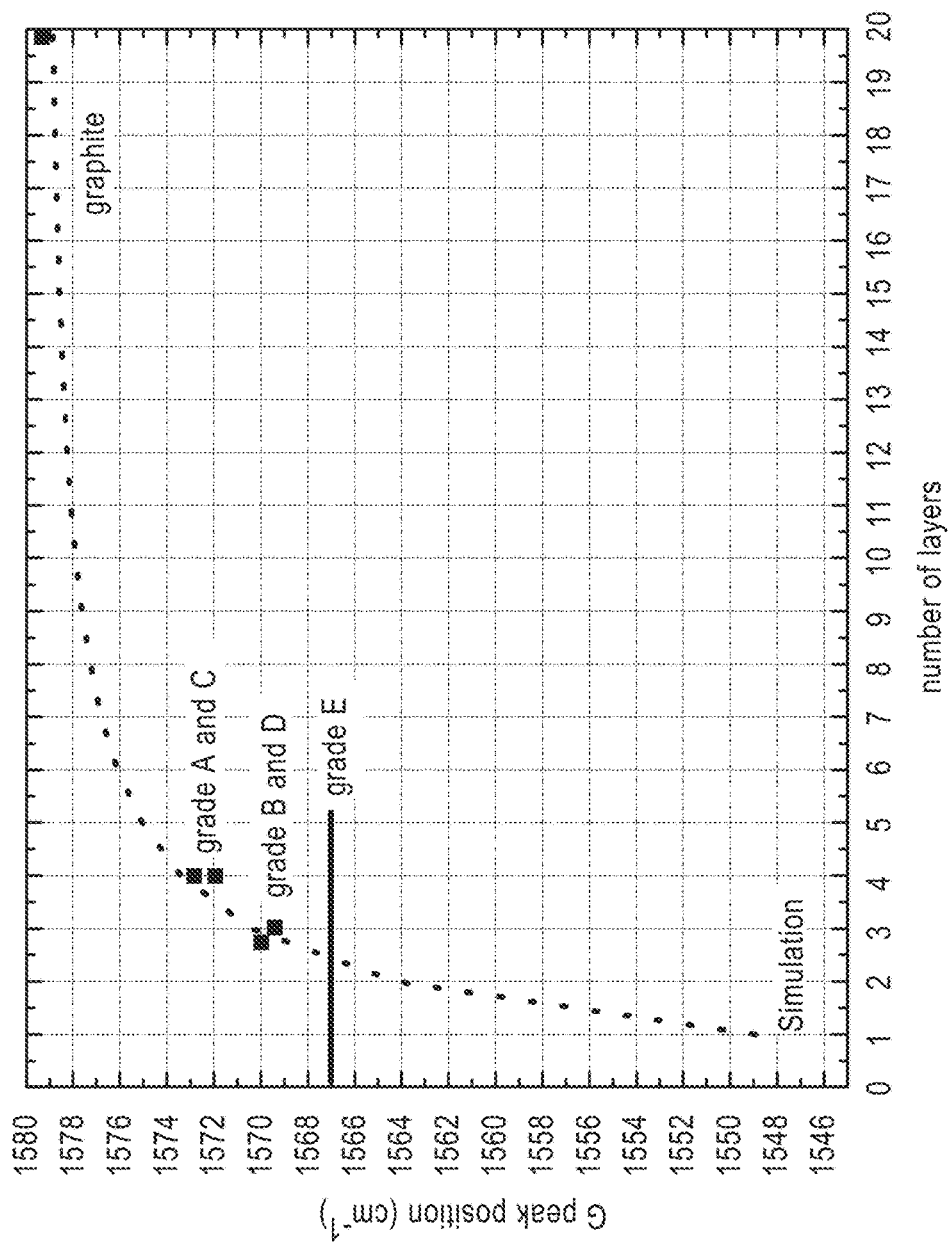
FIG. 9 is a plot showing simulated results of the number of layers in few-layer graphene samples, according to an embodiment.

With respect to the analysis of the G peak, in some embodiments, one may employ the disclosure of the noted J. Raman Spectroscopy article (J. Raman Spectrosc. 2009, 40, 1791-1796) to perform an empirical evaluation of the number of layers can also be determined from G peak position using the equation $$N = N_{Graphite} - \frac{K}{1+n^{1.6}}$$

where N is the wavenumber of the G peak of the FLG n is the number of layers, N$_{Graphite}$ is the wavenumber of bulk graphite corresponding to large value of n (e.g., n>10), and K a calculated coefficient. For example, using the wavenumber for the aforementioned G peaks of Grade A-D, and setting the wavenumber of bulk graphite N$_{Graphite}$ to be about 1579.38 cm$^{-1}$, the coefficient K can be calculated to be about 54±3. In some embodiments, this method of evaluation gives some consistent results for grades B and D with about 2 to 3 layers; however, in some embodiments, a small difference can be observed for Grades A and B indicating up to 4 layers (e.g., instead of 3). FIG. 9 provides calculated values for the number of layers of the graphene sheets of Grades A-D and bulk crystalline graphite in relation to the G peak positions. From a synthesis of the above two methods (analysis of the D peaks and the G peaks) of determining the number of layers in samples of Grades A-D, in some embodiments, a reasonable determination of about 2-3 layers for Grades B and D and about 3-4 for Grades A and C can be made.

Figure 10:
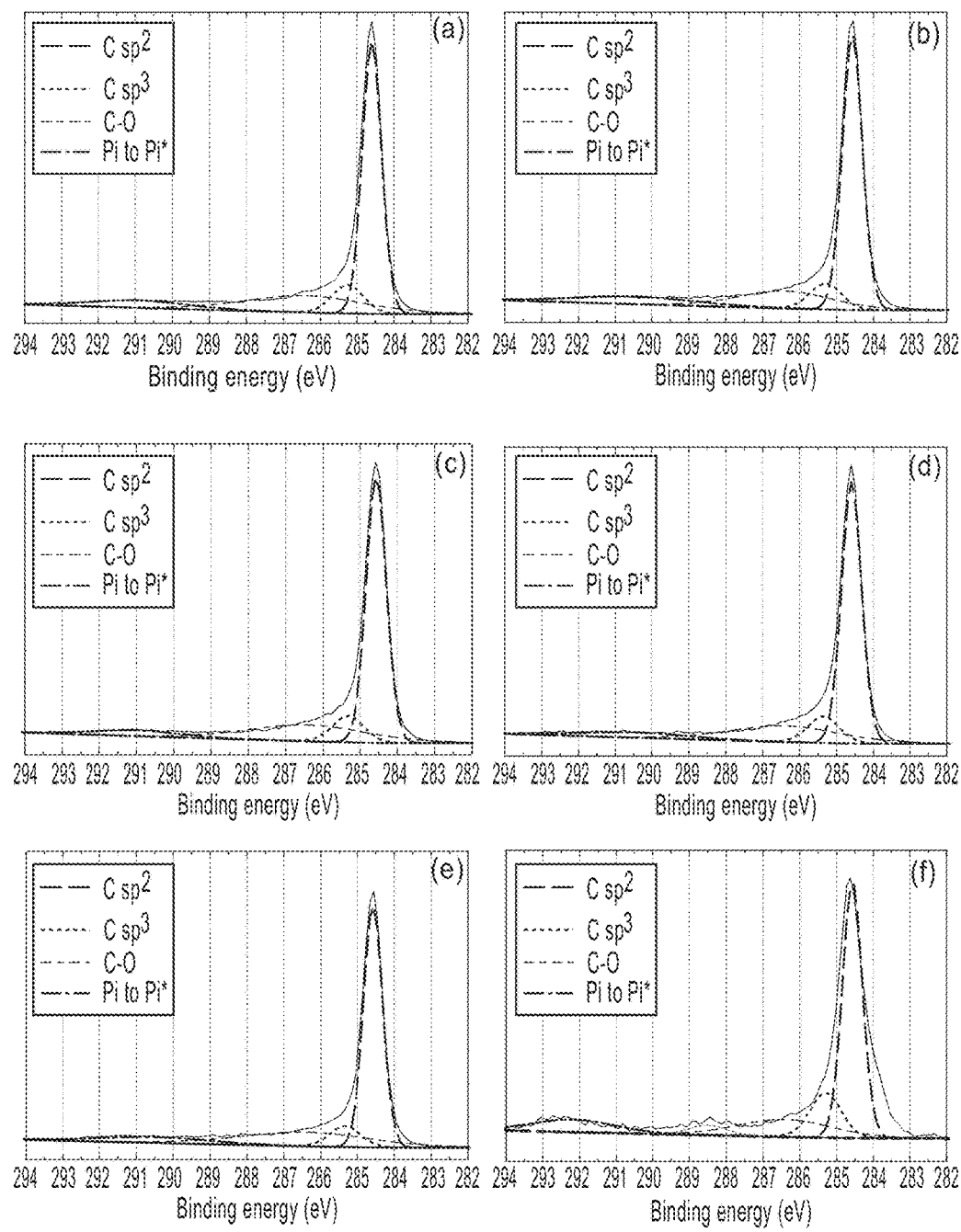
FIGS. 10A-10F are example plots of X-ray photon spectroscopy (XPS) spectra for a series of different few-layer graphene sheets and bulk graphite, according to an embodiment.
Figure 11:
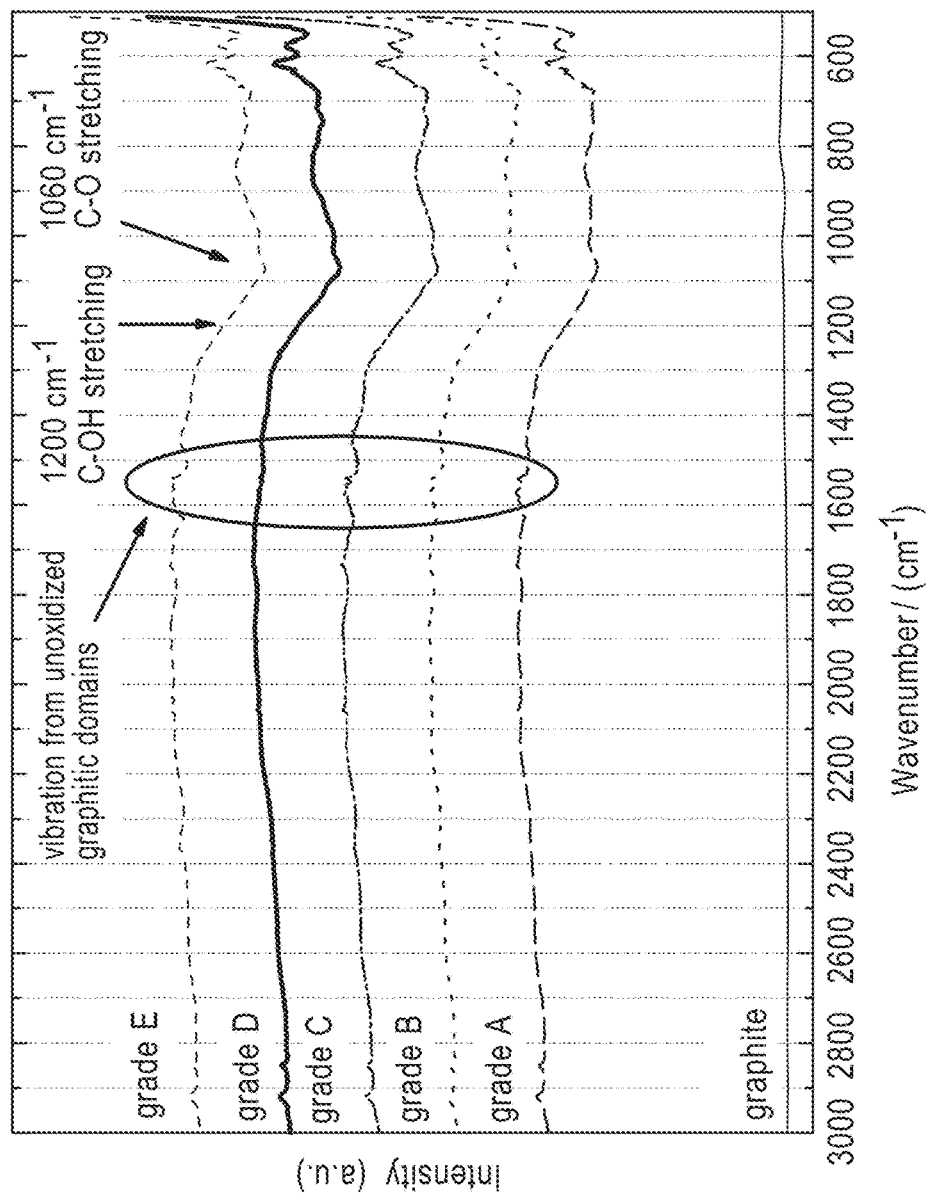
FIG. 11 is an example plot of example Fourier transform infrared spectroscopy by attenuated total reflection (ATR-FTIR) spectra for a series of different few-layer graphene and bulk graphite, according to an embodiment.

As mentioned above, in some embodiments, graphene sheets that are the result of the milling step of the disclosed process are highly charged and contain edges that are hydoxylated, i.e., hydroxyl groups (OFF) are bonded to the edges of the graphene sheets. The appearance of hydroxyl groups at the edges serve as chemical "hooks" for the graphene sheets, and an experimental technique such as X-ray Photon Spectroscopy (XPS) may be used to identify the hydroxyl groups and characterize the surfaces also. For example, for the graphene sheets of grades A, B, C and D, FIG. 10 shows the XPS spectra of Grade A (FIG. 10A), Grade B (FIG. 10B), Grade C (FIG. 10C) and Grade D (FIG. 10D) with some of the peaks corresponding to the atomic orbitals identified. In some embodiments, deconvolution can be performed to semi-quantify the carbon species on the surface where the same pattern was used for all five grades. In some embodiments, four intensity peaks may be identified:

Peak from carbon sp$^2$ due to graphitic carbon. In some embodiments, this peak may be the most intense because graphene is composed of a vast majority of carbon atoms in sp$^2$.

Peak from carbon sp$^3$ due to tetrahedral bonded carbon. This carbon species can be found on the edges of the graphene platelets.

Peak from carbon-oxygen (C—O) is due to the hydroxyl groups on the edges of graphene platelets. This shows that the milling process is capable of effectively functionalizing graphene platelets edges.

Peaks from π-π are typical of graphitic carbon and can be attributed to resonance. The presence can be expected in graphene because this is a graphitic material.

Integrals, i.e., summation of the intensities of each peak for each grade are tabulated below, indicating that all grades comprise activated edges with hydroxyl groups.

TABLE 1

|         | C1s sp3 | C1s sp2 | C1s C—O | C1s C=O | C1s π-π * |
|---------|---------|---------|---------|---------|-----------|
| Grade A | 10.19   | 58.85   | 22.84   | 0       | 8.12      |
| Grade B | 9.23    | 61.71   | 18.54   | 0       | 10.51     |
| Grade C | 9.63    | 61.84   | 22.61   | 0       | 5.92      |
| Grade D | 10.01   | 61.95   | 21.21   | 0       | 6.84      |
| Grade F | 14.69   | 53.19   | 17.2    | 3.94    | 10.98     |

Confirmation of the presence of hydroxyl groups at the edges of the graphene sheets may be obtained from other techniques such as Fourier transform infrared spectroscopy by attenuated total reflection (ATR-FTIR), which may be used to characterize the edge activation and other properties of the various grades. FIG. 12 shows that all grades exhibit the C—O stretching mode around 1060 $cm^{-1}$ and the C—OH stretching mode around 1200 $cm^{-1}$. These modes confirm the presence of hydroxyl groups over the graphene flakes. Around 1600 $cm^{-1}$ the vibration of graphitic domains is observed for the graphene sheets of grades A-D, but not for bulk graphite due to the high number of graphitic layers. This is further evidence that graphene sheets of grades A through D comprise few-layers of graphene, unlike the bulk or large numbers for graphite. The O—H stretching mode around 3400 $cm^{-1}$ has been observed only on the 13.2 (Grade C). This mode was also expected on all other grades. FIGS. 13A-D provide additional example plots of X-ray photon spectroscopy (XPS) (FIG. 13A), Raman (FIG. 13B), TGA (FIG. 13C), and Fourier transform infrared spectroscopy (FTIR) (FIG. 13D) spectra of electrostatically charged and hydroxylated graphene, according to an embodiment.

Figure 12A:
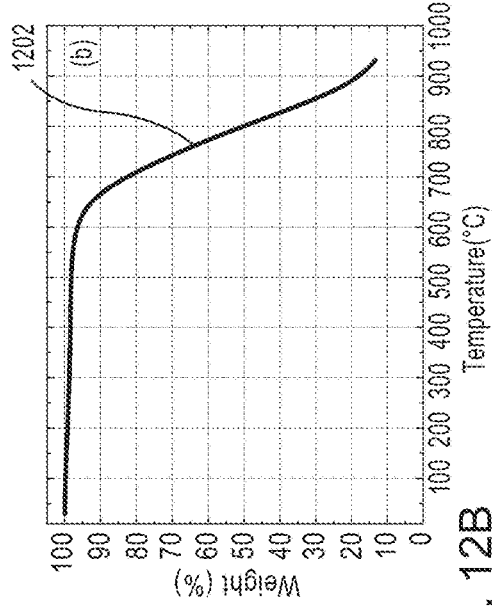
FIGS. 12A-D are plots showing the results of thermo gravimetric analysis of different few-layer graphene, and bulk graphite indicating the thermal stability of these graphene-based materials.
Figure 12B:
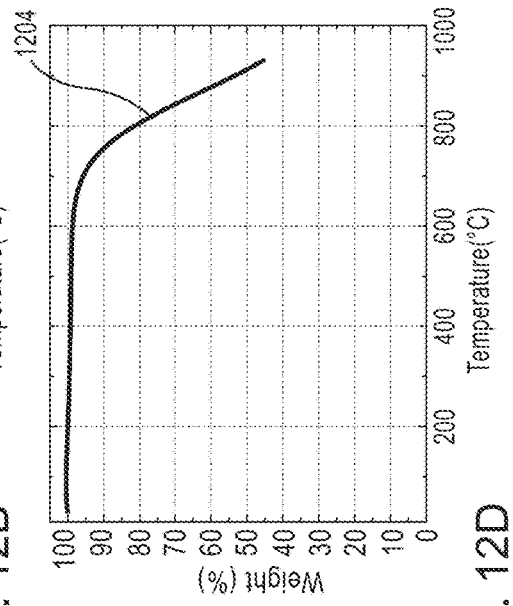

In some embodiments, the thermal stability of the graphene sheets of grades A-D may be investigated via a thermo gravimetric analysis (TGA) that tracks the thermal transitions of the materials as a function of temperature, transitions such as, but not limited to, loss of solvent and plasticizers in polymers, water of hydration in inorganic materials, and/or decomposition of the material. For example, a TGA analysis can be performed for each grade by raising the temperature of a furnace containing the graphene sheets and measuring the sample weight. In FIG. 12, the weight percentage of the sample remaining after mass loss as a function of temperature when the temperature is raised to 930° C. at a rate of 10° C./min in air is shown for the grades A and B (FIG. 12A) and Grades C and D (FIG. 12B). For grades A, B, C and D, the degradation starts at around 690° C., in contrast to 800° C. for graphite and 600° C. for a graphene layer, indicating that these grades comprise few-layer graphene products, agreeing with the results of other measurements such as Raman spectroscopy. In some embodiments, loss prior to degradation has been observed (e.g., at less than 2%) and can be ascribed primarily to residues from the washing process. The results in general show the heat resistance properties of grades A-D graphene sheets.

With reference to FIG. 1, in some embodiments, the graphene sheets of the milling process (e.g., thinned graphene sheets of grades A, B, C and/or D) may be mixed with a strong oxidizer and a non-polar solvent. In some embodiments, the strong oxidizer and the non-polar solvent may be added into the milling vessel. In some embodiments, if the graphene sheets may have been removed from the milling vessel for post-processing, the processed (e.g., washed, filtered, etc.) graphene sheets may be re-introduced into the grinding or milling vessel. In some embodiments, the disclosed milling process can be viewed as a single step process where precursor graphite is milled to reduced its thickness to few layers or less, and the resulting graphene product is further milled in the presence of a strong oxidizer to cause the charging, hydroxylation and at least partial oxidation of the resulting product.

In some embodiments, the weak oxidizer may be included to facilitate the shearing and/or exfoliation process. For example, the crystalline precursor graphite would have been reduced to about 5 hydroxylated graphene sheets, but the presence of the weak oxidizer would assist in reducing the thickness of the thinned graphene sheets from about 5 layers to about 1-layer, 2-layer, 3-layer graphene sheets, and/or the like.

In some embodiments, the strong oxidizer may be formulated to interact with the hydroxyl ions bonded to the edges of the graphene sheets so as to convert the hydroxyl ions into a carbonyl group. As used herein, a "strong" oxidizer refers to a chemical agent with an oxidation potential greater than about 1.5V. Examples of a strong oxidizer include potassium permanganate, iron chloride, persulfate, fluorine, any combination thereof, and/or the like. In some embodiments, the strong oxidizer accomplishes the conversion of hydroxyl ions to carbonyls by removing the hydrogen atom from the hydroxyl ion, resulting in the formation of a double bond between the remaining oxygen atom and a carbon atom on the graphene sheets. In some embodiments, the proportion of hydroxyl ions at the edges of the graphene sheets that convert to carbonyl groups depends on the amount, concentration, type, etc., of the strong oxidizer used. For example, using potassium permanganate as a strong oxidizer, the milling process may accomplish the conversion of about 20% of the hydroxyl at the edges of the graphene sheets to carbonyls.

In some embodiments, the non-polar solvent used during the milling process may be configured to aid in the production of hydroxyl ions as well as in the diffusion of the ions in the electrolyte solution, which may facilitate the eventual bonding of the hydroxyl ions to the edges of the graphene sheets. For example, the non-polar solvent may increase the conductivity of the solution, thereby enhancing the transfer of electrostatic charge through the solution so as to allow the charges to ionize the metal hydroxide salt and produce metal cations and hydroxide anions (i.e., hydroxyls). Further, a higher concentration of non-polar solvent in the electrolyte solution may increase the diffusion length of hydroxyl ions in the solution, facilitating the bonding of hydroxyl ions to the edges of the graphene sheets.

In some embodiments, the non-polar solvent may also be configured to aid in the production of electrostatic charges during the rotation of the milling vessel during the milling process. In addition, the non-polar solvent may enhance the exfoliation and/or shearing of sheets of graphene layers from the ordered crystalline graphite (e.g., besides the solvent's role in the production of electrostatic charges which, as discussed above with respect to the first step of the milling process, contributes to the production of atomic oxygen that exfoliates crystalline graphite). For example, the non-polar solvent may intercalate crystalline graphite and weaken the bonds (e.g., van der Waals bonds) that keep the layers of graphitic materials bound in layers.

Examples of non-polar solvents comprise organic solvents, including organic molecules and ions. For example, organic solvents such as Toluene and N-Methyl-2-pyrrolidone can be used as non-polar solvents in the electrolyte solution during the second stage of the processes. As additional examples, heptane, N,N-Dimethylformamide, acetonitrile, chlorobenzene, dimethyl sulfoxide, N-methyl-2-pyrrolidinone, and/or the like can be used as non-polar solvents for at least any of the above purposes. In some embodiments, the amount, concentration, type, etc., of the non-polar solvent used during the milling process may depend on the solubility of graphitic materials like graphene in the different solvents. For example, the solubility of graphene may be different in different solvents, and the solvent providing maximum solubility to graphene may be chosen for inclusion into the electrolyte solution. Accordingly, the amount of the polar and/or non-polar solvent included during the milling process may be proportional to each other. For example, in some embodiments, water and ethanol may be used in the proportion ranging from about 1000:1 to about 10:1, from about 800:1 to about 100:1, 400:1 to about 200:1, and/or the like, by volume.

With reference to FIG. 1, in some embodiments, the graphite, the strong oxidizer, the non-polar solvent, the polar solvent, the weak oxidizer, the metal hydroxide salt and the surfactant may be rotated in a milling vessel or jar at a desired speed for a period configured to allow the conversion of the hydroxyl ions bonded to the edges of the graphene sheets, e.g., step 101. For example, the highly charged and hydroxylated graphene sheets may be milled for about 2 to 10 hours until a brown, fluffy powder is produced. In some embodiments, the milling period may range from about 2 hour to about 8 hours, from about 2 hour to about 6 hours, from about 2 hour to about 4 hours, and/or the like. The rotation speed may be medium, in the range of from about 100 rpm to about 500 rpm, from about 200 rpm to about 400 rpm, from about 200 rpm to about 250 rpm, and/or the like.

In some embodiments, the milling process may be interrupted every so often to allow the escape of gas that has built up during the rotation of the milling vessel or jar. For example, in some embodiments, the milling process may be stopped every about 30 minutes to evacuate gaseous by-products for safety reasons. In some embodiments, the process of milling may also be performed so as to avoid evaporation of solvents such as water from the aqueous electrolyte solution. For example, the milling vessels or jars used in the milling processes may be kept at a temperature formulated to avoid evaporation of the solvents, such as room temperature.

In some embodiments, the resulting products of the milling step, which may appear brown and have a fluffy structure, may be post-processed to at least remove extraneous by-products or residues such as but not limited to metallic ions, surfactants, metal salts, etc., e.g., step 104 of FIG. 1. For example, the product may be washed with one or more of water, acid (e.g. hydrochloric acid), ethanol, etc., The acid helps neutralize any alkaline or basic residue remaining on the graphene sheets and lowers the pH of the resulting final product. In some embodiments, the washing may be followed by vacuum filtration and vacuum drying. The resulting final product of the milling process can be single or thinned few layer graphene sheets that are highly electrostatically charged, hydroxylated and partially oxidized. For example, these graphene sheets can be partially oxidized graphene sheets with hydroxylated edges where at least some of the hydroxyls are converted into carbonyl molecules, which tend to be more active for bonding with other materials than the hydroxyl groups. In some embodiments, the portion of hydroxyl ions that convert into carbonyls may range from about 10% to about 40%, from about 15% to about 35%, from about 15% to about 30%, about 20%, etc., of the hydroxyls. The conversion allows graphene sheets to exhibit enhanced dispersibility and mixability in both polar and non-polar solvents, which results from electrons that are released in solvents such as water during the breaking of one of the double bonds that bind carbon and oxygen atoms in a carbonyl molecule. Accordingly, the final product shows good dispersibility and mixability in various matrixes such as polar solvents, non-polar solvents, polymers, and/or the like, for example.

In some embodiments, after washing and neutralization, product is subjected to a jet milling step. While the product of the first milling process can be single or FLG sheets having a relatively consistent thickness, the product may have a wide distribution of particle sizes when measuring the lateral or in-plane size of the nanoflakes. Jet milling the product helps create a uniform particle size distribution (PSD) nanoflakes. In some embodiments, the PSD after jet milling can have a D10 value of 200 nm, D50 value of 2.2 microns, and a D95 value of 9.0 microns. In some embodiments, the product has an average, lateral nanoflake diameter of 4 microns and average thickness is 20 layers (7 nm), so the flake size to thickness ratio is 4000 nm/7 nm, which is equal to 570. The jet milling reduces the flake size more significantly than thickness, which is a goal of the jet milling process. A uniform PSD facilitates the homogeneous incorporation of the nanoflakes into the polymer. During melt mixing, a uniform PSD of the nanoflakes helps improve the dispersion throughout the polymer. During spray coating, a uniform PSD of the nanoflakes helps provide a homogeneous suspension of the nanoflakes in a solution.

In some embodiments, the disclosed process can produce a large quantity of graphene sheets that are highly electrostatically charged, hydroxylated and partially oxidized in a single setting, representing a high yield of about 92% under certain conditions. In some embodiments, the yield may range from about 85% to about 95%.

At least some embodiments of the disclosed milling process have been employed experimentally to treat the graphene sheets as discussed herein. In some embodiments, the final graphene sheets of the process following the milling process can be conveniently classified into the following class or grade:

Grade F: A highly activated few-layer graphene of about 2 to 3 graphene layers with at least some of the hydroxyl groups at the edges of the graphene sheets have oxidized to form carbonyl groups. Grade F can further be classified into grades F1 and F2 based on at least the lateral sizes of the graphene sheets, and/or the ratio of carbonyl to hydroxyl attached to the edges of the graphene sheets. Grade F1 usually have more carbonyls and exhibit different properties than grade F2 graphene sheets. For example, some of the graphene sheets can have a lateral size (e.g., flake diameter) in the range of from about 0.1 µm to 0.2 µm (Grade F2) and 0.2 µm to 0.5 µm (Grade F1).

In some embodiments, Raman spectroscopy can be used to characterize the properties of grade F graphene sheets such as thickness, defect density, etc. Using visible light (e.g., 532 nm wavelength light corresponding to 2.33 eV energy), the Raman spectra for grade F FLG may be obtained as shown in FIG. 5, which shows the G, D and 2D peaks that are discussed above with reference to with respect to grades A, B, C and D. Using similar techniques described above for obtaining the thicknesses of grades A-D, the thicknesses of grade F graphene sheets may be determined to be about 1 to 3 graphene layers.

Similarly, XPS may be used to characterize the surfaces and identify the hydroxyl groups attached to grade F graphene sheets, as shown in FIG. 10F, where the aforementioned four intensity peaks can be identified, corresponding to peaks from carbon sp², carbon sp³, carbon-oxygen (C—O) and π-π bond. Integrals, i.e., summation of the intensities of each peak for grade F is tabulated in Table 1 above, indicating that grade F graphene sheets comprise activated edges with hydroxyl groups.

TABLE 2

|  | C1s sp3 | C1s sp2 | C1s C—O | C1s C=O |
|---|---|---|---|---|
| Graphite | 16% | 63% | 21% | 0% |
| Electrostatically Charged Graphene | 11% | 66% | 23% | 0% |
| Partially Oxidized Graphene | 16% | 60% | 19% | 3.94% |

FIG. 6 shows the deconvoluted XPS Carbon is spectra of Grade F. The main difference from the other grades is the emergence of a new peak around 287.5 eV that can be attributed to carbonyl, which is confirmed by the non-zero value for the integration of the peaks that indicates a 3.94% presence of carbonyl groups (as shown in the table above, Table 2), in contrast to the vanishing values for grades A-D. Hydroxyl group quantification is lower in Grade F compared to Grades A to D, and it is noticeable that the difference corresponds with the quantification of carbonyl groups, leading to the conclusion that some hydroxyl groups have been oxidized to form carbonyl.

Figure 14C:
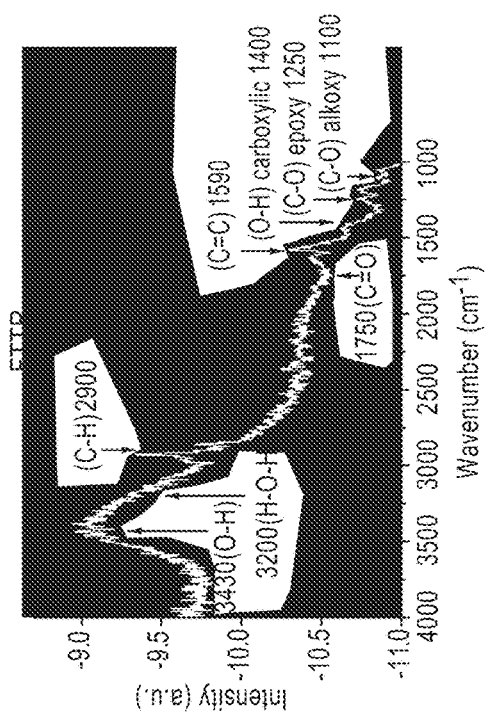
FIGS. 14A-14C are example plots of XPS, TGA, and FTIR spectra of at least partially oxidized graphene, respectively, according to an embodiment.

In some embodiments, FTIR measurements can provide additional supporting evidence as to the XPS detection of the presence of carbonyl groups on the edges of grade F FLGs. For example, FIG. 14C shows the FTIR spectra of grade F FLGs where several significant absorption bands, corresponding to different local environments, can be identified:
- around 1100 cm$^{-1}$ wavenumber, due to the stretching mode of alkoxy C—O bonds,
- around 1250 cm$^{-1}$ wavenumber, due to the epoxy C—O asymmetric stretching vibrations,
- around 1400 cm$^{-1}$ wavenumber, associated with the carboxy O—H bonds,
- around 1590 cm$^{-1}$ wavenumber, corresponding to C=C, from the non-oxidized sp² carbon bonds,
- around 1750 cm$^{-1}$ wavenumber, associated with C—O, stretching vibrations,
- around 3200 cm$^{-1}$ wavenumber, comprising contribution from the adsorbed water molecules, and
- around 3430 cm$^{-1}$ wavenumber associated with the O—H oscillations in the carboxylic groups, on the edges of graphene planes, as well as in between the graphene sheets.

Figure 14A:
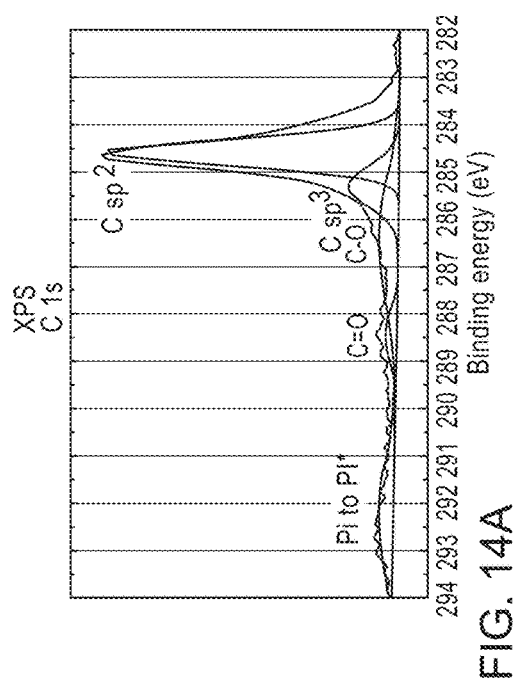
Figure 14B:
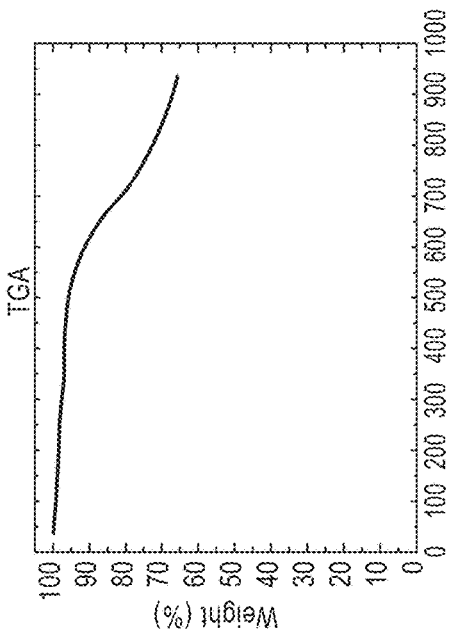
Figure 15:
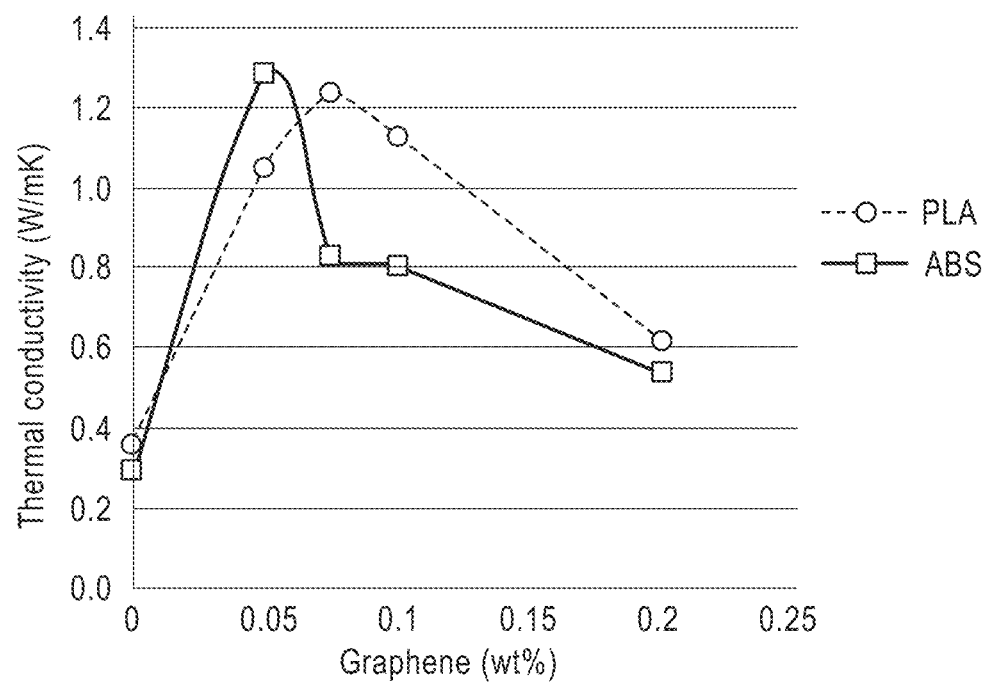
FIG. 15 shows an example plot of thermal conductivity of graphene/polylactic acid (PLA) as a function of graphene concentration by weight, according to an embodiment.
Figure 16:
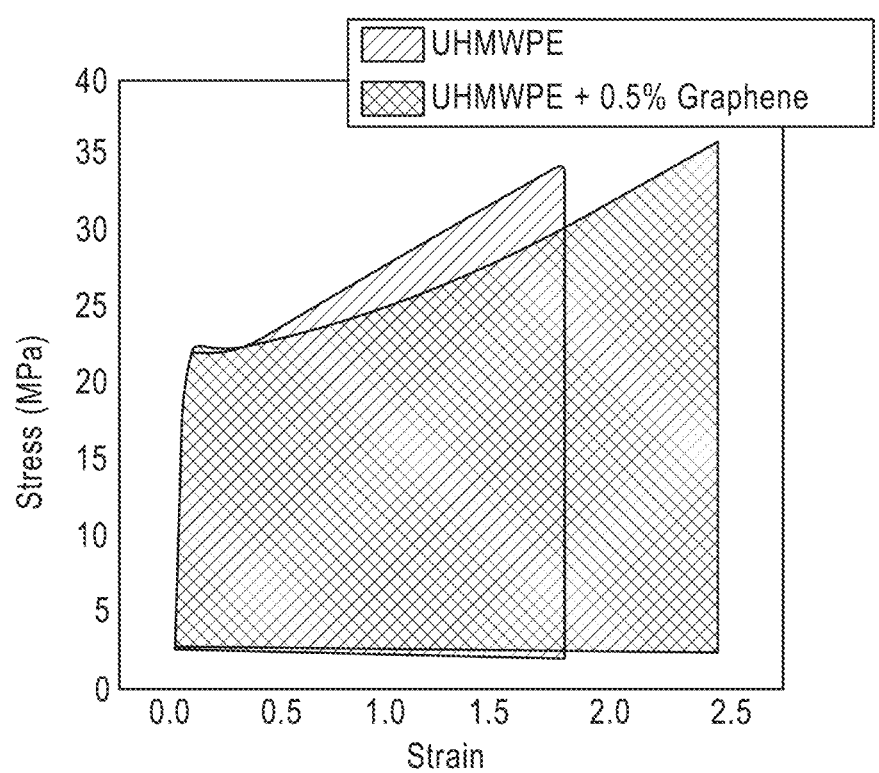
FIG. 16 shows an example experimental demonstration of the effect of adding about 0.5 wt % of grade D graphene into UHMWPE (Ultra High Molecular Weight Polyethylene), according to an embodiment.

These measurements show that carbonyl groups were added to the hydroxyl groups on the edges of the platelets, and in general provide further evidence of edge activation of the graphene sheets. FIG. 14 provides additional example plot of XPS, TGA, and FTIR spectra of (partially) oxidized graphene, according to an embodiment.

Figure 12C:
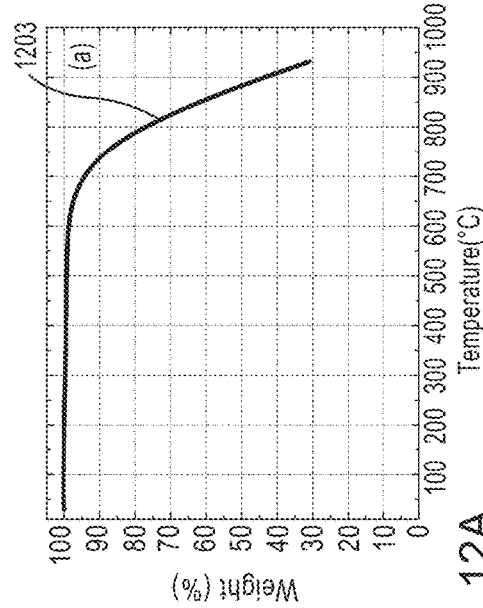
Figure 12D:
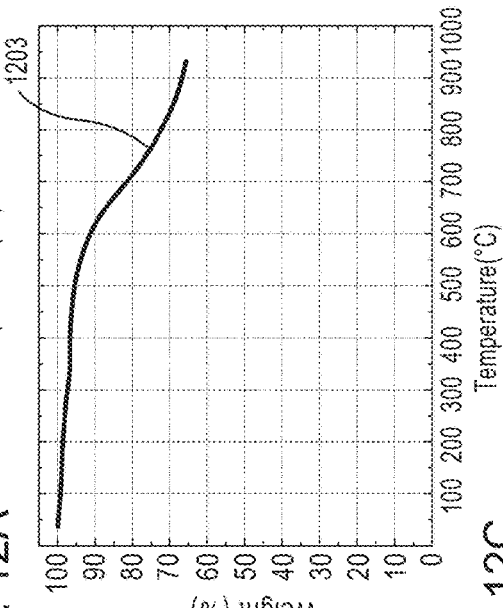
Figure 13B:
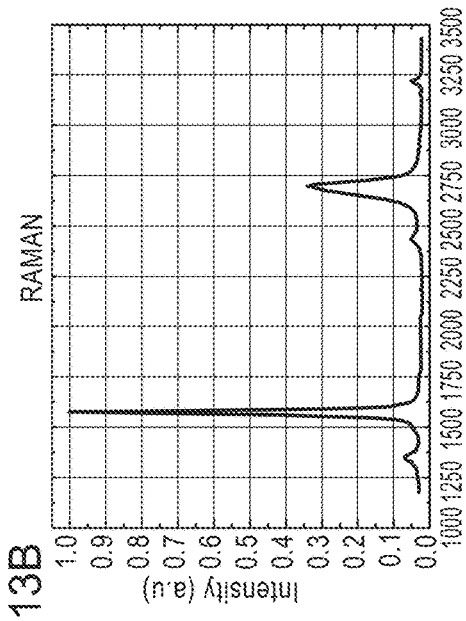
FIGS. 13A-D are example plots of XPS, Raman, thermo gravimetric analysis (TGA), and FTIR spectra of electrostatically charged and hydroxylated graphene, respectively, according to an embodiment.
Figure 13D:
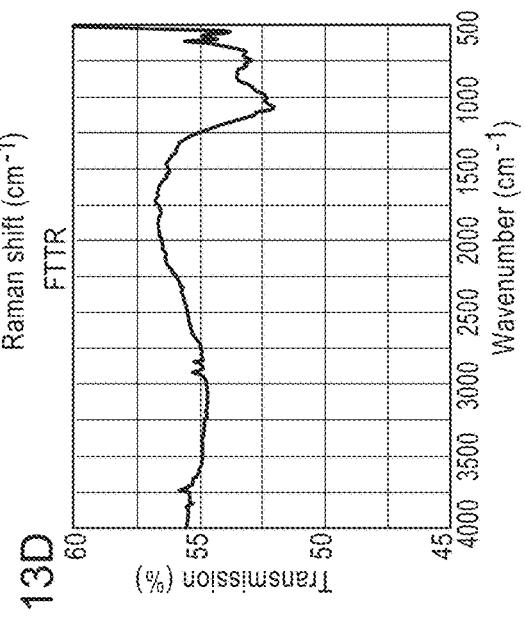
Figure 13A:
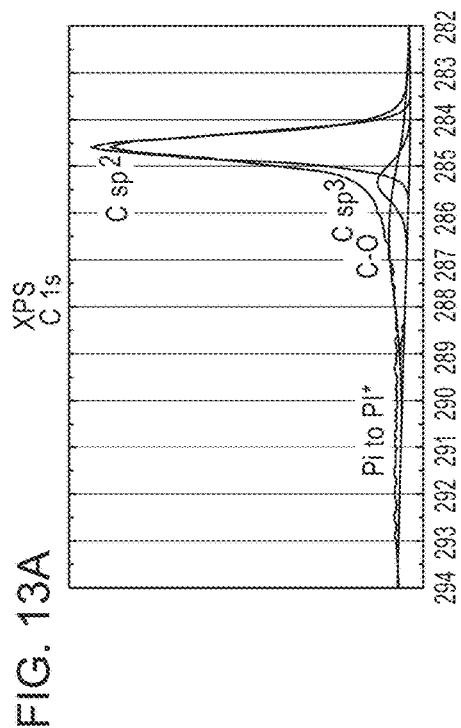
Figure 13C:
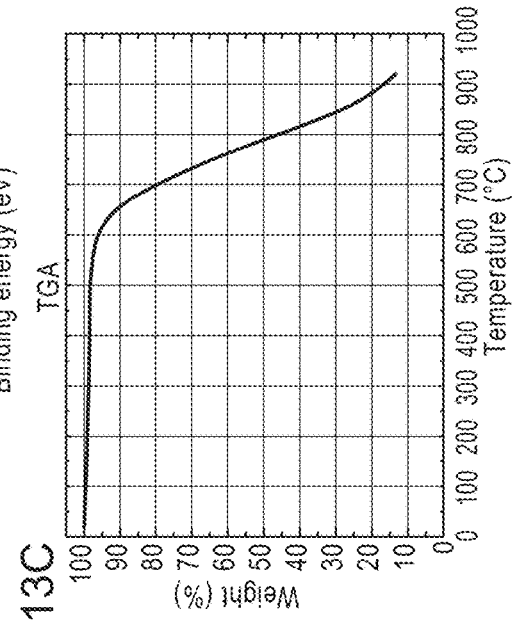

In some embodiments, the thermal stability of the graphene sheets of grade F may also be investigated via a thermo gravimetric analysis (TGA) similar to as discussed above with reference to grades A-D. For example, a TGA analysis can be performed by raising the temperature of a furnace containing grade F graphene sheets and measuring the sample weight. FIG. 12C shows the weight percentage of the sample remaining after mass loss as a function of temperature when the temperature is raised to 930° C. at a rate of 10° C./min rate in air. In the figure, two weight decreases can be observed in the TGA data, where at around 250° C., structural water, hydroxyl and carbonyl groups are removed from the powder, and at around 592° C., the decomposition of the graphene sheets occurs. This decomposition temperature can be slightly lower than that for Grade D but still very close, showing that the pristine nature of the graphene sheets has been conserved during the milling processes. The results also show the heat resistance properties of grade F graphene sheets.

Methods of Compounding Graphene with Host Materials

When in use, in some embodiments, graphene sheets may aggregate and not disperse uniformly throughout the host materials 105 (e.g., polymers). Ultrasonication for liquid resins, and compounder and extrusion for thermoplastics via melt mixing have been used to de-aggregate aggregated graphene nanoflakes and disperse them well into polymers. Ultrasonication can be effective in de-agglomerating graphene nanoflakes in liquid media, and can even facilitate further exfoliation of graphene. However, due to limited dispersibility of graphene in liquid media, typically in the range of about 0.1 to about 1 mg/ml, as well as long processing time required, it may be challenging to apply the method at large scales for commercial applications. Moreover, graphene nanoflakes in a dispersion solution may not be stable in that the flakes tend to agglomerate and precipitate out of the solution. Although surfactants can be used to improve the stability to a certain degree, in some embodiments, settling of graphene nanoflakes may occur, which can be undesirable for the practical application of graphene in many areas such as coatings, paints, and printing materials. In some embodiments, in particular for coating applications, it would be desirable to have an in-situ graphene exfoliation and coating technology to avoid the difficulties associated in preparing stable graphene-containing coating solutions.

On the other hand, although melt mixing of graphene with thermoplastics can be implemented using commercial compounder and extruder via one of the various mixing methods, including melt compounding, solvent blending, and in-situ polymerization. In some embodiments, melt compounding can be less effective in dispersing exfoliated graphene in polymer matrices. In yet some embodiments, an improved dispersion of graphene in polymer may be achieved by initially dispersing graphene nanoplatelets (GNPs) in a non-solvent by sonication, followed by further mixing with polymer to produce polymer particles uniformly coated with GNPs prior to melt mixing. The improved dispersion of the graphene in polymer can be deduced from the lower electrical percolation threshold of the GNP/polypropylene composite.

In some embodiments, melt mixing efficiency can be improved by suspending graphene nanoflakes in a solution of first polymer particles, subsequently followed by the spray coating of second polymer particles to yield a core-shell structure. However, the droplets sizes in the spray coating can be large (for example greater than about 10 µm), and in combination with the adhering effect of the first polymer in the sprayed droplets, there may be little or no de-agglomeration or exfoliation of graphene nanoflakes in such embodiments. The graphene coated polymer particles were then subject to injection molding and the volume resistivity and gas barrier properties were evaluated. Decreases in volume resistivity can be observed for graphene modified materials after graphene coated polymer particles are subjected to injection molding, however, there may be little or no obvious improvement in gas barrier properties, suggesting an insufficient dispersion of graphene. Thus, for effective melt mixing, a pre-exfoliation and mixing of graphene nanoflakes with polymer particles or pellets may be desirable. In some embodiments, the present disclosure provides methods of effectively de-agglomerating and/or exfoliating graphene nanoflakes for pre-mixing graphene nanoflakes with polymers prior to melt mixing. In particular, the methods include a compounding method via electrospray coating to produce uniform and highly dispersed graphene/polymer composites.

In some embodiments, electrospray coating includes the application of a very high voltage bias (e.g., a few thousands volt) between the spray nozzle and the target, which can lead to the formation of highly electrostatically charged jet droplets having much smaller sizes (e.g., about 1 μm). Due to high charge density and electrostatic stress, the jet droplets can further break down during flight towards target, resulting in even smaller droplets in nanometers. Electrospray coating graphene nanoflakes onto polymer host materials can lead to the effective de-agglomeration and/or exfoliation of graphene nanoflakes, resulting in the production of graphene/polymer compounds with highly dispersed graphene nanoflakes on the surface of polymer particles. Further melt processing of thus obtained graphene/polymer compound by, for example, extrusion and injection molding, can provide graphene/polymer composites comprising polymer matrices having uniformly and well dispersed graphene materials.

In some embodiments, one may allow for the intercalation of graphite by electron or hole donors such as alkali metals so as to cause the exfoliation of the graphite into thinned graphene nanoplatelets (e.g., 2-10 nm in thickness) and the trapping (i.e., stabilizing) of charges in the nanoplatelets. Due to the extensively π-conjugated structure, graphene and/or graphite are known to be capable of stabilizing charges. Thus, expanded intercalated graphite can be easily prepared by complexing graphite with electron or hole donors. By allowing the introduction of charges into graphene nanoflakes during the electrospray coating process, one may engender the in-situ de-agglomeration and exfoliation of graphene nanoflakes, and further prevent restacking of graphene during compounding with non-conductive polymers. The resulting graphene/polymer compounds can be used as master batch and further mixed with other thermoplastic materials or processed as it is by conventional techniques such as compounding, extrusion, injection molding, or compression molding to produce uniformly and highly-dispersed graphene composites in thermoplastics. Moreover, the methods according to the present disclosure can be scaled for large-scale production.

In some embodiments, the disclosed method comprises electrospray coating graphene nanoflakes on the surface of polymer fine particles, polymer pellets, fibers, fabrics, non-woven, films, and formed articles. In some of such embodiments, the term of "graphene nanoflakes" is used as a collective term for single-layer graphene, few layer (e.g., about 2-about 10 layers) graphene, graphene platelets (e.g., >about 10 layers), graphene oxide, expanded graphite oxide, or a mixture of them. They may be present as isolated particles or as relatively loosely stacked agglomerate. For example, the graphene nanoflakes can be single-layer or few layer graphene with low defects, for example, low $sp^3$ Carbon (C) content as identified by low D/G band ratio (e.g., <about 0.4, <about 0.2) in Raman spectroscopy. Few layer graphene nanoflakes are commercially available from Group NanoXplore Inc. (Canada) under the trademarks of, for example, heXo-g-C and heXo-g-D. In some of the disclosed embodiments, the term "electrospray coating" refers to a process where a jet of powders, paste, or liquid breaks up under influence of electrostatic forces and accelerates towards the coating host under a bias of high electrical voltage, yielding, at least in some embodiments, uniformly coated substrates with highly dispersed particles.

Figure 17:
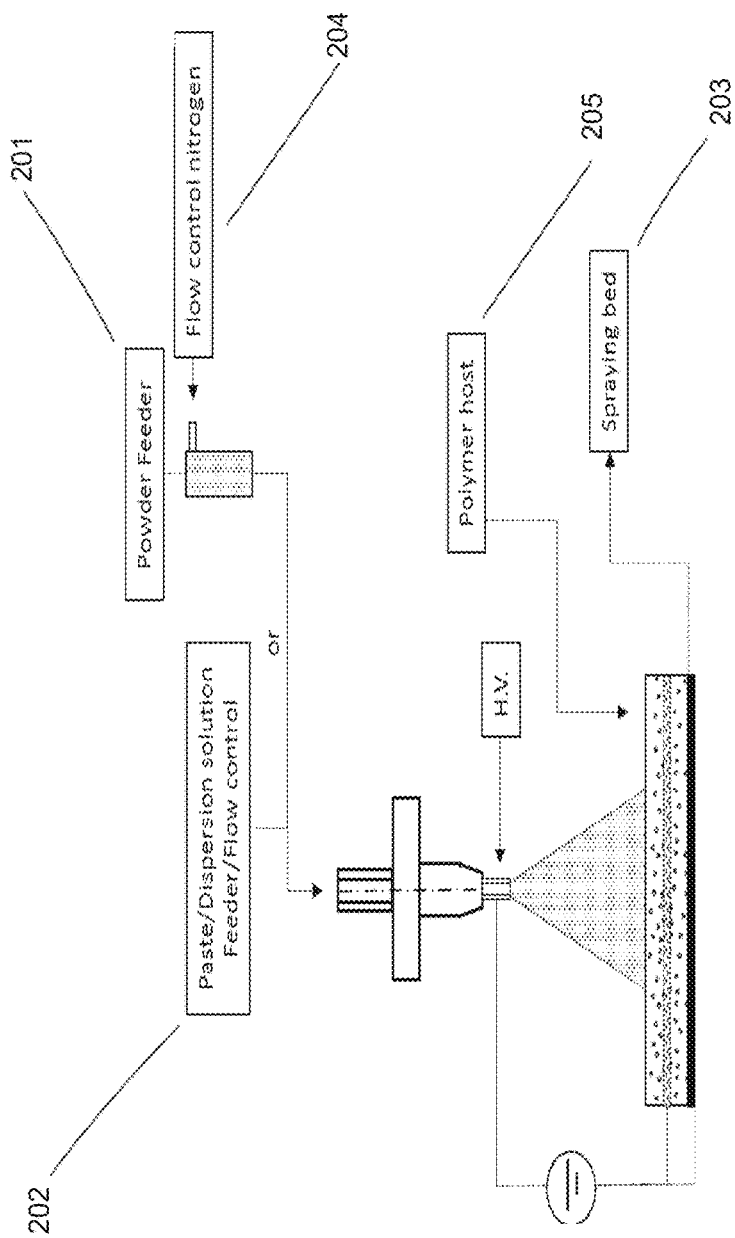
FIG. 17 is a schematic illustration of an electrospray system for producing graphene nanoflakes/polymer compounds, according to an embodiment.

FIG. 17 shows a schematic illustration of an electrospray system for producing graphene nanoflakes/polymer compounds, according to an embodiment. In some embodiments, graphene nanoflakes in the form of dry powders 201, paste, or dispersion solution 202 can be transferred to the spray nozzle at a low flow rate. An electric field can be applied over the graphene nanoflakes by applying a voltage bias between the nozzle and a counter electrode, for example, the spray bed 203. The electric field applied can be a high voltage in the range of from about 500 to about 20,000 V, from about 1,000 to about 15,000 V, from about 2,000 to about 10,000 V, from about 2,500 to about 8,000 V, etc. In some instances of the embodiments, the spraying bed can be a metal mesh, or a metal plate, or a combination thereof. In some embodiments the spraying bed can be electrically grounded. In case of graphene nanoflake powders, the electric field applied can directly charge the particles at the nozzle exit, resulting in a jet towards the spraying bed. When electrostatic repulsion forces within the jet exceed the Van der Waals forces, de-agglomeration and exfoliation of graphene nanoflakes occur to yield graphene nanoflakes with even smaller thickness. Once coated onto the substrates, the temporarily trapped electric charges within the graphene nanoflakes keep the nanoflakes from restacking, yielding uniformly coated substrates with highly dispersed graphene nanoflakes.

In case of paste or dispersion solutions, the electric stress can lead to the emergence of conically shaped droplets from the tip of the nozzle, followed by the formation of a jet from the cone apex, which may break up into charged monodisperse-like droplets. The utilization of a volatile liquid in the paste and the dispersion solution can lead to a fast evaporation, resulting in shrinkage in size of the droplets during the flight towards the host. However, the charge density in the droplet may be increasing and at a critical limit, the droplets may break up into smaller droplets. As a result of the progressive evaporation and break up, de-agglomeration and exfoliation of graphene nanoflakes can occur, yielding uniformly coated substrates with highly dispersed graphene nanoflakes.

For controlling the flow rate of graphene nanoflake powders, paste, or dispersion solution, a pressurized system 204 (e.g., using nitrogen) can be employed to deliver the graphene nanoflakes to the spray nozzle. The pressure used can be in the range of from about 5 to about 40 psi, about 5 to about 30 psi, etc. During the spray coating, the spray nozzle can be moved in the planar directions so as to enhance uniform coverage of the surface of the substrate (e.g., at a speed in the range of from about 0 to about 40 mm/s). In such embodiments, the spray nozzle can be positioned at some distance above the polymer host, the distance ranging from about 5 cm to about 50 cm, from about 10 cm to about 40 cm, from about 15 cm to about 35 cm, etc.

In one embodiment, the method of compounding graphene nanoflakes with polymer powders, polymer pellets, or short fibers, via the electrospray coating technique, comprises the steps of: (i) feeding or transferring graphene nanoflakes to a spray nozzle that is charged at high voltage; (ii) feeding or transferring polymer particles to a spraying bed that is electrically grounded; (iii) spraying the highly electrostatically charged graphene towards the spraying bed, on which the polymer particles are continuously tumbled. For example, polymer particles may be transferred to a polymer bed which may be electrically grounded. Further, graphene nanoflakes may be transferred to a spray nozzle charged to a high voltage so as to induce electrostatic charge in the graphene nanoflakes. In addition, the electrostatically charged graphene nanoflakes may be transferred or sprayed from the spray nozzle to the polymer bed, while the polymer particles are tumbling in the polymer bed.

The graphene nanoflakes can be single-layer graphene, few-layer (e.g., about 2-about 10 layers) graphene, graphene nanoplatelets (e.g., >about 10 layers), graphene oxide, expanded graphite oxide, or a mixture thereof, and can have lateral sizes in the range of about 20 nm to about 50 μm, about 50 nm to about 20 μm, about 200 nm to about 5 μm, about 200 nm to about 2 μm, etc.

In one embodiment, the graphene nanoflakes can be fed or transferred to the spray nozzle in the form of dry powder, paste, or dispersion solution. With respect to the dry powder, the graphene nanoflakes may be subject to sieving (e.g., using #400 sieves) before entering the spraying system. The powders can be fed through a powder addition funnel, which may be controlled using a step motor, into a chamber equipped with an inlet for a pressurized gas such as nitrogen. Then, for example, the powders can be carried by a nitrogen flow to the spray nozzle, and subject to high electric voltage charging and spraying. The flow rate of the nanoflakes can be controlled by the pressure of the pressurized gas, and the flow rate may be in the range of about 0.5 to about 200 mg/min, about 5 to about 100 mg/min, etc. In some embodiments, exceedingly high flow rate of the graphene nanoflakes may result in insufficient charging and ineffective de-agglomeration and exfoliation. Similarly, if the flow rate is too low, it may be difficult to meter the powders and maintain a constant flow.

In some embodiments, the graphene nanoflakes can be electrostatically charged at the spray nozzle to a high potential. For example, the potential can be in the range of from about 500 to about 20,000 V, from about 2000 to about 8000 V, etc. Due to the electrostatic repulsion, de-agglomeration and/or exfoliation of graphene nanoflakes can take place immediately or nearly immediately at the nozzle exit or during the flight towards the polymer host. Upon coating on the non-conductive polymer host, charges that remain on the de-agglomerated/exfoliated graphene can prevent graphene nanoflakes from restacking.

In one embodiment, the graphene nanoflakes can be fed to the spray nozzle as a paste that may be produced by mixing the graphene nanoflakes with a volatile solvent, examples of which include water, alcohols having from about 1 to about 10 carbons such as methanol, ethanol, propanol, isopropanol, 1-butanol, 2-butanol, t-butanol, pentanol, hexanol, cyclohexanol, diacetone alcohol, etc., ketones having from about 1 to about 10 carbons such as acetone, methyl ethyl ketone, ethyl isopropyl ketone, cyclopentanone, cyclohexanone, etc., hydrocarbons such as alkanes having from about 5 to about 12 carbons including hexane, heptane, octane, nonane, cyclohexane, etc., and aromatic solvents such as, but not limited to, toluene and xylene, cyclic compounds such as, but not limited to, THF, ethylene carbonate, propylene carbonate, polar aprotic solvents such as DMF, NMP, DMSO, sulfolane, and combinations thereof. In some embodiments, the volatile solvent used may have a boiling point in the range of 60-200° C., 60-160° C., etc.

In some of the disclosed embodiments, the term "paste" is used to refer to a thick, soft, moist graphene nanoflake compound, which shows no apparent liquidity but remain flowable under pressure, optionally containing other components except for the solvent. The content of the graphene nanoflakes in the paste is from about 5 to about 99% by weight, from about 10 to about 80% by weight, from about 15 to 65% by weight, etc. Surfactants such as ionic or neutral surfactants, for example, sodium dodecyl sulfate, sodium dodecylbenzenesulfonate, or Triton X-100, can optionally be added at a weight ratio, in relative to the weight of the graphene nanoflakes, of no greater than about 20%, no greater than about 10%, no greater than about 5%, no greater than about 2%, to improve the wetting property of the graphene nanoflakes.

The paste can be fed to the spray nozzle using a gear pump at a selected flow rate, for example, at a flow rate of 0.1-1 ml/min. In case the paste is too thick and shows undesirable flow-ability, dilution using compatible volatile solvents as described above before feeding can be performed.

In one embodiment, the graphene nanoflakes can be fed to the spray nozzle as a dispersion solution that is produced by dispersing the graphene nanoflakes in a volatile solvent, examples of which include water, alcohols having about 1 to about 10 carbons such as methanol, ethanol, propanol, isopropanol, 1-butanol, 2-butanol, t-butanol, pentanol, hexanol, cyclohexanol, diacetone alcohol, etc., ketones having about 1 to about 10 carbons such as acetone, methyl ethyl ketone, ethyl isopropyl ketone, cyclopentanone, cyclohexanone, etc., hydrocarbons such as alkanes having about 5 to about 12 carbons including hexane, heptane, octane, nonane, cyclohexane, etc., and aromatic solvents such as, but not limited to, toluene and xylene, cyclic compounds such as, but not limited to, THF, ethylene carbonate, propylene carbonate, polar aprotic solvents such as, but not limited to, DMF, NMP, DMSO, sulfolane, and combinations thereof. In some embodiments, the volatile solvent used can have a boiling point in the range of from about 60 to about 200° C., in the range of from about 60 to about 150° C., etc. The content of the graphene nanoflakes in the dispersion solution can be about 5% by weight or less, about 2% by weight or less, about 1% by weight or less, etc.

In some of the disclosed embodiments, the term "dispersion solution" is used to refer a stable suspension solution of graphene nanoflakes in solvents as described above, optionally containing other components. In some embodiments, graphene nanoflakes may not dissolve in most or all solvent systems, however, the nanoflakes may disperse in solvents at low concentrations. The dispersion solution can be fed to the spray nozzle using a gear pump at a selected flow rate, such as at the rate of from about 1 to about 20 ml/min. The spray bed and the polymer host can optionally be heated to facilitate solvent evaporation.

In some embodiments, salts, for example, metal salts, e.g., sodium chloride, potassium chloride, magnesium chloride, and calcium chloride, or organic salts, e.g., quaternary ammonium salts such as ammonium chloride, pyridinium chloride and tetrabutyl ammonium bromide, polyacid-tertiary amine adducts, etc., can be added to the dispersion solution to increase the ionic strength and to improve the jet droplet formation and the coating quality. The salt content in the dispersion solution can be 5% by weight or less, 1% by weight or less, 0.1% by weight or less, etc., in relative to the total weight of the dispersion solution.

The dispersion solution optionally can comprise further soluble or dispersible polymer precursors, oligomers, or polymers, examples of which include polyethylene, polypropylene, polyolefin, ABS, poly(meth)acrylates, polystyrene, polyamides, polyester, polycarbonate, polyurethane, polyimides, polysulfones, poly(aryl ether ketone)s, fluorinated polymers, combinations thereof, etc. The weight ratio of the polymer precursors, oligomers, or polymers to graphene nanoflakes can be in the range of about 0.01 to about 500, in the range of about 0.05 to about 100, in the range of about 0.05 to about 0.5, in the range of about 5 to about 100, etc.

In some of the disclosed embodiments, the term "polymer precursors" is used to refer to reactive monomers, oligomers, or polymers that can subsequently react by itself or with other chemicals, with or without the presence of catalyst, to produce polymers. The term "oligomers" may refer to macromolecules that have higher molecular weight than small molecules but lower molecular weight than polymers, for example, the molecular weight can be in the range of about 100 to about 10,000, in the range of about 500 to about 8,000, etc. Suitable oligomers can be linear, branched, star shaped, or dendritic in structure. The term "polymer" may refer to macromolecules that have a molecular weight, for example, the number average molecular weight (Mn), higher than about 10,000. The polymers can have linear structures, branched structures, hyperbranched structures, or dendritic structures, or the polymers can be homopolymers, random copolymers, blocked copolymers, or polymers with gradient structures, or the polymers can be crystalline or amorphous or liquid crystalline, or the polymers can be thermoplastic or thermoset.

The soluble or dispersible polymer precursors, oligomers, or polymers can be added to modify the surface of graphene nanoflakes or as a binder material to enclose the de-agglomerated and/or exfoliated graphene nanoflakes.

The dispersion solution optionally may comprise metal oxides, examples of which include titanium dioxide, silica, iron oxide, zinc oxide, alumina, manganese oxides, etc., and combinations thereof. The weight ratio of metal oxide to graphene nanoflakes can be in the range of from about 0.01 to about 99, in the range of from about 0.1 to about 90, in the range of from about 0.5 to about 50. Metal oxides added to the coating system can increase functionalities such as UV protection, photocatalytic activity, abrasion resistance, and/or the like.

The dispersion solution optionally may comprise ionic or neutral surfactants, for example, sodium dodecyl sulfate, sodium dodecylbenzenesulfonate, Triton X-100, etc., at a weight ratio, in relative to the weight of the graphene nanoflakes, of no greater than about 20%, no greater than about 10%, no greater than about 5%, no greater than about 2%, to improve the wetting property of the graphene nanoflakes.

In yet another embodiment, the graphene nanoflakes, in the form of dry powder, paste, or dispersion solution, can comprise other carbon materials, for example, such as but not limited to carbon blacks, carbon fibers, carbon nanofibers, carbon nanotubes, etc. combinations thereof, with a weight ratio in relative to the graphene nanoflakes being from about 1000 to about 0.01, from about 500 to about 0.1, from about 100 to about 0.1, from about 10 to about 0.1, etc.

In one embodiment, the electrospray coating of graphene nanoflake powders can be carried out for polymer fine powders having sizes in the range of from about 0.5 μm to about 1 mm, from about 1 to about 500 μm, from about 50 to about 200 μm, etc. Mechanical shaker, or other mixing mechanisms such as mechanical stirrer, can be used to continuously mix coated and uncoated polymer particles, and also to allow the charges on graphene nanoflakes to be collected by the grounded spray bed.

The polymer fine powders can be powders of thermoplastic polymers, examples of which include polyethylene, polypropylene, polyolefin, ABS, poly(meth)acrylates, polystyrene, polyamides, polyester, polycarbonate, polyurethane, polyimides, polysulfones, poly(aryl ether ketone)s, fluorinated polymers, etc., and combinations thereof.

In some embodiments, high boiling point liquid coating agent can be optionally premixed with the polymer powder so as to stabilize the graphene nanoflakes on the surface of the polymer powders. For example, the high boiling point liquid coating agent can be optionally premixed with the polymer powder at a weight ratio, in relative to the polymer powder, of about 0.05 to about 5% by weight, about 0.1 to about 2% by weight, about 0.2 to about 1% by weight, etc. Examples of suitable high boiling point liquid coating agent include ester plasticizer such as bis(2-ethylhexyl) phthalate and bis(2-propylheptyl) phthalate, and mineral oil, and/or the like.

The weight ratio of dry graphene nanoflakes to the polymer powders in coated powders can be no greater than about 10% by weight, no greater than about 7% by weight, no greater than about 3% by weight, etc.

In one embodiment, the electrospray coating of graphene nanoflake powders can be carried out for polymer pellets having length in the range of about 1 to about 15 mm, in the range of about 2 to about 12 mm, in the range of about 2 to about 5 mm, and diameter in the range of about 0.5 to about 6 mm, in the range of about 1 to about 5 mm, in the range of about 2 to about 4 mm, etc. In yet another embodiment, the electrospray coating of graphene nanoflake powders can be carried out for polymer short or long fibers.

The polymer pellets or fibers can be those of thermoplastic polymers, examples of which include polyethylene, polypropylene, polyolefin, ABS, poly(meth)acrylates, polystyrene, polyamides, polyester, polycarbonate, polyurethane, polyimides, polysulfones, poly(aryl ether ketone)s, fluorinated polymers, etc., and combinations thereof.

In some embodiments, high boiling point liquid coating agent can be optionally premixed with the polymer powder so as to stabilize the graphene nanoflakes on the surface of the polymer pellets or fibers. For example, the high boiling point liquid coating agent can be optionally premixed with the polymer powder at a weight ratio, in relative to the polymer powder, of about 0.05 to about 5% by weight, about 0.1 to about 2% by weight, about 0.2 to about 1% by weight, etc. Examples of suitable high boiling point liquid coating agent include ester plasticizer such as bis(2-ethylhexyl) phthalate and bis(2-propylheptyl) phthalate, and mineral oil, and/or the like.

The weight ratio of dry graphene nanoflakes to the polymer pellets or fibers in coated materials can be no greater than about 10% by weight, no greater than about 7% by weight, no greater than about 3% by weight, etc.

In one embodiment, the graphene/polymer powder or pellet compounds obtained according to the present disclosure can be further mixed with other polymer powders or pellets as described above through mechanical mixing.

In another embodiment, the graphene/polymer powder or pellet compounds obtained according to the present disclosure or their mixture with other polymer powders or pellets can be further processed by extrusion to produce graphene/polymer composite filaments or pellets or formed articles with highly dispersed and uniformly distributed graphene nanoflakes in the polymer matrices.

In another embodiment, the graphene/polymer powder or pellet compounds obtained according to the present disclosure or their mixture with other polymer powders or pellets can be further processed by injection molding to produce formed articles with graphene nanoflakes highly dispersed and uniformly distributed in the polymer matrices.

In yet another embodiment, the graphene/polymer powder or pellet compounds obtained according to the present disclosure or their mixture with other polymer powders or pellets can be further processed by compression molding to produce formed articles with graphene nanoflakes highly dispersed and uniformly distributed in the polymer matrices.

In another embodiment, the method of coating graphene nanoflakes on polymer films, fabrics, non-woven, and formed articles to modify the surface electrical conductivity, the gas or moisture barrier properties, the UV resistance, and abrasion resistance, comprises the steps of: (i) feeding or transferring graphene nanoflakes as defined above to a spray nozzle that is charged at high voltage; (ii) feeding or transferring the polymer host to a movable spraying bed that is electrically grounded; (iii) spraying or transferring the highly electrostatically charged graphene nanoflakes towards the polymer host that is positioned on an electrically grounded conveying bed.

In one embodiment, the graphene nanoflakes, in the form of dry powder, paste, or dispersion solution as described above, can be electrospray coated on a polymer film. The spray nozzle can be held still, while the electrically grounded conveying bed moves the polymer film.

In one embodiment, the graphene nanoflakes, in the form of dry powder, paste, or dispersion solution as described above, can be electrospray coated on a polymer fabric.

In one embodiment, the graphene nanoflakes can be electrospray coated on a polymer fabric or non-woven from a dispersion solution that optionally further comprises metal oxide, examples of which include titanium dioxide, silica, iron oxide, zinc oxide, alumina, manganese oxides, etc., and combinations thereof, with the weight ratio of metal oxide to graphene nanoflakes being in the range of about 0.01 to about 99, in the range of about 0.1 to about 90, in the range of about 0.5 to about 50, and soluble or dispersible polymer precursors, oligomers or polymers, examples of which include polyethylene, polypropylene, polyolefin, ABS, poly(meth)acrylates, polystyrene, polyamides, polyester, polycarbonate, polyurethane, polyimides, polysulfones, poly(aryl ether ketone)s, fluorinated polymers, etc., and combinations thereof, with the weight ratio of the polymer precursors, oligomers, or polymers to graphene nanoflakes being in the range of about 0.01 to about 500, in the range of about 0.05 to about 100, in the range of about 0.05 to about 0.5, in the range of about 5 to about 100, etc.

EXAMPLES

The electrospray coating set up discussed in this disclosure is schematically illustrated in FIG. 17. In some experimental embodiments, the graphene nanoflakes in the form of dry powders, paste, or dispersion solution are fed to the spray nozzle at a low flow rate. An electric field is applied over the graphene nanoflakes by applying a voltage bias between the nozzle and a counter electrode, which in some cases can be the spray bed. The electric field applied between the nozzle and the spraying bed is a high voltage in the range of 2,000-10,000 V. The spraying bed comprises a metal mesh and a metal plate, with the two electrically connected and the metal being positioned about 5 mm above the metal plate. The metal plate was positioned on a mechanical shaker, which allows for continuous mixing of polymer hosts during the electrospray coating process. For non-particulate polymer host, such as film, fabric, non-woven, and formed articles, the spray bed can be replaced with a conveying bed that is electrically grounded.

For controlling the flow rate of graphene nanoflakes, a pressurized nitrogen system was employed to deliver the graphene nanoflakes to the spray nozzle. The nitrogen pressure used is in the range of 5-30 psi. The spray nozzle moves in the xy directions, with moving speed in the range of 0-40 mm/s. The movement of spray nozzle can be pre-programmed through a computer. In some experimental embodiments, the spray nozzle is positioned at a distance of 5-50 cm above the polymer host, in yet another at a distance of 15-35 cm. The nozzle orifice has a diameter of about 0.2 mm.

For electrospray coating graphene nanoflakes dry powders, the powders are first fed through a powder addition funnel, which is controlled using a step motor, into a chamber equipped with a nitrogen inlet. A gentle nitrogen flow was provided to carry the powders to the spray nozzle. The flow rate of the nanoflakes can be controlled in the range of 0.5 to 200 mg/min. Graphene nanoflake paste and dispersion solutions were fed to the spray nozzle directly using a gear pump at a flow rate of 0.1-1 mL/min for the paste and 1-20 mL/min for the dispersion solution.

Example 1: Compounding of Graphene Nanoflakes with Polymer Fine Particles

Graphene nanoflakes (HeXo-g-C, commercially available from Group NanoXplore Inc.) were first sieved using a #400 sieve to remove large particles. Through a powder addition funnel, the graphene nanoflake powders were fed to the spraying system at a feeding rate of 25 mg/min. A gentle nitrogen flow (8 psi) was used to carry the powders to the spraying nozzle, which was charged at an electric voltage of 3.5 kV. The spraying nozzle was positioned 20 cm above ultra-high-molecular-weight polyethylene (UHMWPE) fine powders as the polymer host. 10.0 g of UHMWPE was premixed with 0.05 g of mineral oil, and was contained in the spraying bed and mechanically shaken continuously. The spraying nozzle moved in the x-direction back and forth at 6 mm/s within a length of 15 cm. The electrospray coating process was performed for 2 min to yield graphene nanoflake coated UHMWPE powders containing about 0.5 wt. % of graphene.

Example 2: Compounding of Graphene Nanoflakes with Polymer Pellets

Graphene nanoflakes (HeXo-g-D, commercially available from Group NanoXplore Inc.) were first sieved using a #400 sieve to remove large particles. Through a powder addition funnel, the graphene nanoflake powders were fed to the spraying system at a feeding rate of 60 mg/min. A gentle nitrogen flow (11 psi) was used to carry the powders to the spraying nozzle, which was charged at an electric voltage of 4.2 kV. The spraying nozzle was positioned 20 cm above low-density polyethylene (LDPE) pellets as the polymer host. 10.0 g of LDPE pellets was premixed with 0.05 g of mineral oil, and was contained in the spraying bed and mechanically shaken continuously. The spraying nozzle moved in the x-direction back and forth at 4 mm/s within a length of 15 cm. The electrospray coating process was performed for 2 min to yield graphene nanoflake coated UHMWPE powders containing about 1 wt. % of graphene.

Example 3: Compounding of Graphene Nanoflakes with Polymer Fine Particles by Using Graphene Nanoflake Paste Graphene nanoflakes (HeXo-g-D, commercially available from Group NanoXplore Inc.) was first sieved using a #400 sieve to remove large particles, and then mixed with t-butanol and diacetone alcohol (9/1, v/v) to give a paste with a solid content of 25 wt. %. To the paste was added sodium dodecyl sulfate (SDS) at a concentration of 0.5 wt. % and ammonium chloride at a concentration of 0.2 wt. %, both based on the total weight of the paste, and the resulting mixture was homogenized before fed to the spraying system at a feeding rate of 0.2 ml/min using a gear pump. A gentle nitrogen flow (15 psi) was used to control the flow. The spraying nozzle was charged at an electric voltage of 3.8 kV, and was positioned 20 cm above UHMWPE fine powders as the polymer host. 10.0 g of UHMWPE fine powders was premixed with 0.05 g of mineral oil, and was contained in the spraying bed and mechanically shaken continuously. The spraying nozzle moved in the x-direction back and forth at 10 mm/s within a length of 15 cm. The electrospray coating process was performed for 2 min to yield graphene nanoflake coated UHMWPE powders containing about 1 wt. % of graphene.

Example 4: Compounding of Graphene Nanoflakes with Polymer Fine Particles by Using Graphene Nanoflake Dispersion Graphene nanoflakes (HeXo-g-D, commercially available from Group NanoXplore Inc.) was first sieved using a #400 sieve to remove large particles, and then dispersed in N,N-dimethylformamide (DMF) containing 0.01 wt. % of Triton X-100 and 0.02 wt. % of tetrabutylammonium bromide to give a stable dispersion solution with a graphene concentration of 0.1 wt. %. The dispersion solution was fed to the spraying system at a feeding rate of 6 ml/min using a gear pump. A gentle nitrogen flow (8 psi) was used to control the flow. The spraying nozzle was charged at an electric voltage of 3.8 kV, and was positioned 25 cm above UHMWPE fine powders as the polymer host. 10.0 g of UHMWPE fine powders was premixed with 0.05 g of mineral oil, and was contained in the spraying bed and mechanically shaken continuously. The spraying bed was preheated to 50° C. and kept at the temperature during the coating process. The spraying nozzle moved in the x-direction back and forth at 10 mm/s within a length of 15 cm. The electrospray coating process was performed for 9 min to yield graphene nanoflake coated UHMWPE powders containing about 0.5 wt. % of graphene.

Example 5: Compounding of Graphene Nanoflakes with Polymer Pellets by Using Graphene Nanoflake Dispersion Graphene nanoflakes (HeXo-g-D, commercially available from Group NanoXplore Inc.) was first sieved using a #400 sieve to remove large particles, and then dispersed in N,N-dimethylformamide (DMF) containing 0.01 wt. % of Triton X-100 and 0.02 wt. % of tetrabutylammonium bromide to give a stable dispersion solution with a graphene concentration of 0.1 wt. %. The dispersion solution was fed to the spraying system at a feeding rate of 5 ml/min using a gear pump. A gentle nitrogen flow (8 psi) was used to control the flow. The spraying nozzle was charged at an electric voltage of 3.8 kV, and was positioned 25 cm above LDPE pellets as the polymer host. 10.0 g of LDPE pellets was premixed with 0.05 g of mineral oil, and was contained in the spraying bed and mechanically shaken continuously. The spraying bed was preheated to 50° C. and kept at the temperature during the coating process. The spraying nozzle moved in the x-direction back and forth at 10 mm/s within a length of 15 cm. The electrospray coating process was performed for 20 min to yield graphene nanoflake coated UHMWPE powders containing about 1 wt. % of graphene.

Example 6: Electrospray Coating of Graphene Nanoflakes on Polymer Fabrics

Graphene nanoflakes (HeXo-g-D, commercially available from Group NanoXplore Inc.) was first sieved using a #400 sieve to remove large particles, and then dispersed in water and diacetone alcohol (4:1, v/v) containing 1.2 wt. % of zinc oxide (<100 nm, Sigma Aldrich), polyurethane (12 wt. % solid content), and 0.02 wt. % tetrbutylammonium bromide to give a stable dispersion solution with a graphene concentration of 0.1 wt. %. The dispersion solution was fed to the spraying system at a feeding rate of 1 ml/min using a gear pump. A gentle nitrogen flow (8 psi) was used to control the flow. The spraying nozzle was charged at an electric voltage of 4.2 kV, and was positioned 18 cm above a 10 cm×10 cm Kevlar fabric as the host. The fabric was placed on a spraying bed that was preheated to 40° C. The spraying nozzle moved in the xy-direction at 10 mm/s to coat an area of about 10 cm×10 cm in dimension. The electrospray coating process was performed for 2 min to yield a coated Kevlar fabric.

The following examples of improvement resulted from addition of graphene to different thermoplastics using the aforementioned methods and twin screw extrusion:

Example 7: Effect of Graphene Addition on Tensile Strength

Figure 18:
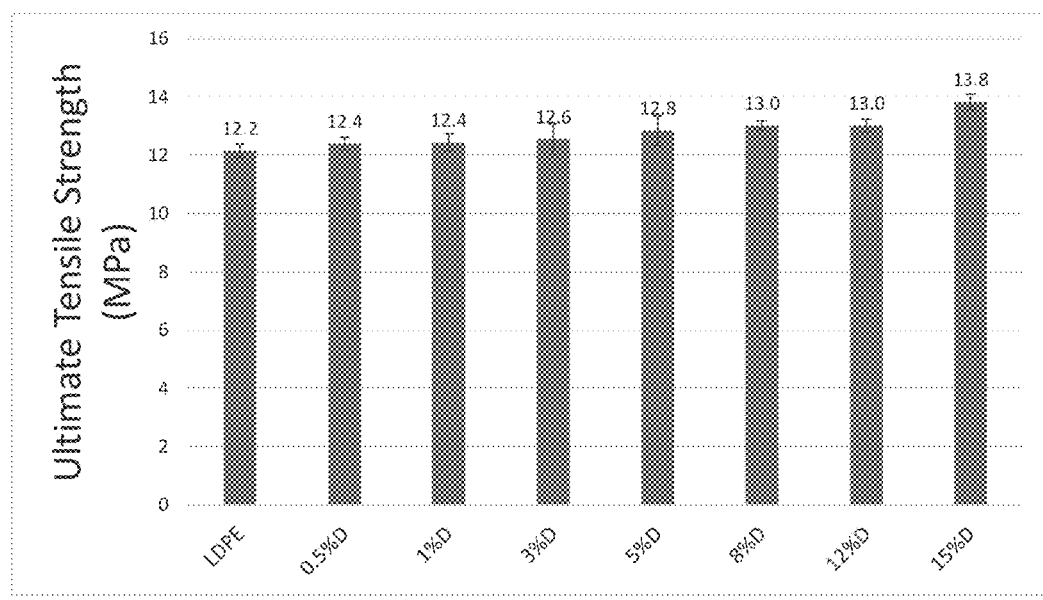
FIG. 18 is a bar chart of ultimate tensile strength results from LDPE/grade-D composites.
Figure 19:
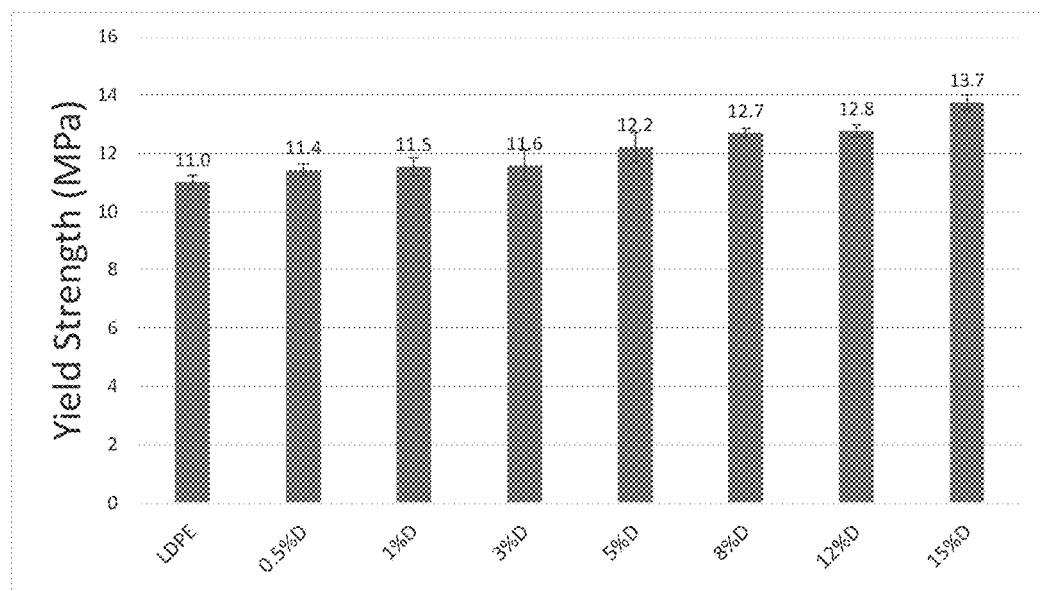
FIG. 19 is a bar chart of yield strength results from LDPE/grade-D composites.

Graphene nanoflakes (HeXo-g-D, commercially available from Group NanoXplore Inc.) were combined with LDPE (Petrothene NA870252, commercially available from LyondellBasell Industries), which was used as the base material for graphene/polymer composites. Tensile dumbbell shape specimens were prepared by injection molding the composites. FIG. 18 shows the ultimate tensile strength obtained from LDPE and LDPE/graphene-D composites. The strength of the material gradually increases when graphene concentration is increased, going from 12.2 MPa to 13.8 MPa (13%) at 15% graphene loading. The same trend was observed for yield strength as depicted in FIG. 19. The yield strength of the composite with 15% graphene is about 25% higher than LDPE with no graphene.

Example 8: Effect of Graphene Addition on Yield Strength

Figure 20:
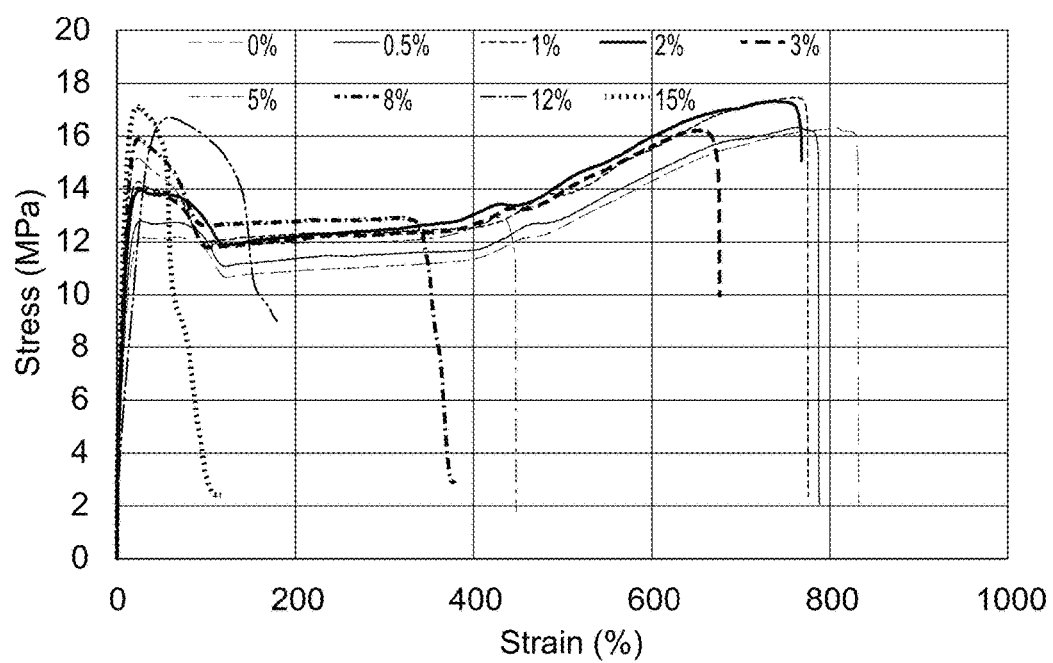
FIG. 20 is a graph of stress-strain curves obtained from LLDPE/grade-D composites.

Graphene nanoflakes (HeXo-g-D, commercially available from Group NanoXplore Inc.) were combined with LLDPE (NovaPol PI-2024-A, commercially available from NOVA Chemicals Corporation), which used as the base material for graphene/polymer composites. Adding 15 wt % of graphene to the LLDPE increases the yield strength by more than 20%. FIG. 20 shows the engineering stress-strain curves obtained from LLDPE and LLDPE/graphene-D composites.

The yield strength of the material increases when graphene concentration is increased, going from 12.3 MPa to 17.7 MPa (35%). It was also observed that from FIG. 20 that the tensile strength peak at break gradually reduces and disappears as the concentration of graphene increases. When the concentration of graphene reaches to 8%, the tensile strength peak at break disappears.

Example 9: Effect of Graphene Addition on Tensile Strength

Graphene nanoflakes (HeXo-g-D, commercially available from Group NanoXplore Inc.) were combined with PA 6,6 (commercially available from BASF Corporation), which used as the base material for graphene/polymer composites. Tensile dumbbell shape specimens were prepared by injection molding the composites.

Figure 21:
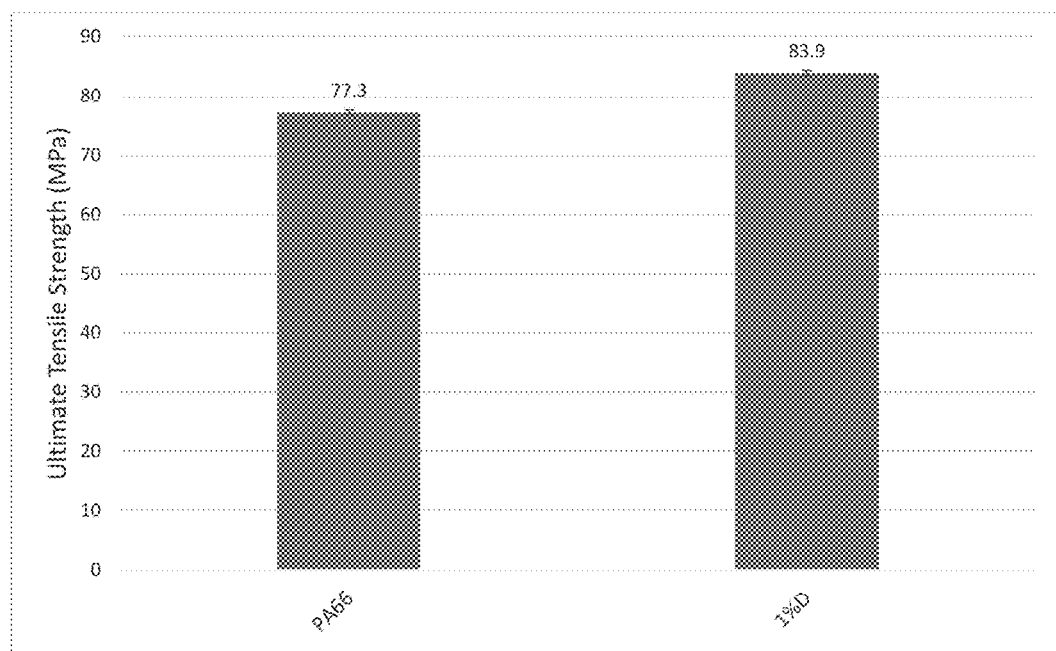
FIG. 21 is a bar chart of ultimate tensile strength results of PA 6,6/1% graphene and pristine PA 6,6.

FIG. 21 shows the tensile (yield) strength PA 6,6 and PA 6,6 with 1% graphene, averaged from four specimens per batch. The tensile strength showed 9% increase by adding 1% graphene grade-D to PA 6,6.

Example 10: Effect of Graphene Addition on Mechanical Properties

The addition of graphene nanoflakes (HeXo-g-D, commercially available from Group NanoXplore Inc.) to HDPE (injection molding grade) can also improve its mechanical properties (see Table 3). The added graphene-D improved not only tensile modulus, but also tensile strength.

TABLE 3

Tensile strength and modulus of HDPE (Injection grade)/graphene.

| Material | Tensile Modulus (MPa) | Tensile Strength (MPa) |
|---|---|---|
| HDPE | 958 | 22.7 |
| HDPE + 0.5% D | 1062 | 24.5 |
| HDPE + 2% D | 1102 | 24.4 |

Example 11: Effect of Graphene Addition on Chemical Properties

The addition of graphene nanoflakes (HeXo-g-D, commercially available from Group NanoXplore Inc.) to HDPE (blow molding grade) can also improve its mechanical properties (see Table 2). Table 4 shows oxygen transmission rate of HDPE with and without 1% graphene-D at 23° C. and relative humidity of 0%. The results show 22% improvement in oxygen impermeability when 1% graphene is added to HDPE. The surface area of testing was 20 cm$^2$.

TABLE 4

Oxygen permeability of HDPE (blow molding grade)/graphene.

| Material | Permeability (cc · mm/m$^2$ · day) |
|---|---|
| HDPE | 146 |
| HDPE + 1% D | 113 |

While various embodiments of the system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modification are in accordance with the variations of the invention. For example, the non-aqueous electrolyte can also include a gel polymer electrolyte. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of coating non-conductive polymer particles with graphene nanoflakes, comprising:
    transferring polymer particles to a bed;
    electrically grounding the bed;
    transferring graphene nanoflakes to a spray nozzle;
    charging the spray nozzle to a voltage to induce an electrostatic charge in the graphene nanoflakes;
    transferring the electrostatically charged graphene nanoflakes from the spray nozzle to the bed; and
    tumbling the polymer particles while the electrostatically charged nanoflakes are transferred from the spray nozzle to the bed.

2. The coating method of claim 1, wherein the graphene nanoflakes can be fed to the spray nozzle in the form of at least one of a dry powder, a paste, and a dispersion solution.

3. The coating method of claim 2, wherein the paste of graphene nanoflakes is produced by mixing the graphene nanoflakes with a volatile solvent.

4. The coating method of claim 3, wherein the content of the graphene nanoflakes in the paste is about 5 to about 99% by weight.

5. The coating method of claim 3, wherein at least one of an ionic surfactant and a neutral surfactant is added at a weight ratio relative to the weight of the graphene nanoflakes of no greater than about 20% to improve the wetting property of the graphene nanoflakes.

6. The coating method of claim 5, wherein the dispersion solution comprises at least one of polymer precursors, oligomers, and polymers.

7. The coating method of claim 6, wherein the weight ratio of the at least one of polymer precursors, oligomers, and polymers to graphene nanoflakes is in the range of about 0.01 to about 500.

8. The coating method of claim 2, wherein the dispersion solution of graphene nanoflakes is produced by dispersing the graphene nanoflakes in a volatile solvent.

9. The coating method of claim 8, wherein the graphene content in the dispersion solution is about 5% by weight or less.

10. The coating method of claim 9, wherein a salt is added to the dispersion solution to increase an ionic conductivity.

11. The coating method of claim 10, wherein the salt content in the dispersion solution is about 5% by weight or less relative to the total weight of the dispersion solution.

12. The coating method of claim 8, wherein the dispersion solution further comprises a metal oxide selected from a group consisting of titanium dioxide, silica, iron oxide, zinc oxide, alumina, and manganese oxide, and combinations thereof.

13. The coating method of claim 12, wherein a weight ratio of metal oxide to graphene nanoflakes is in the range of about 0.01 to about 99.

14. The coating method of claim 8, wherein at least one of an ionic surfactant and a neutral surfactant, is added at a weight ratio of no greater than about 20% relative to the weight of the graphene nanoflakes.

15. The coating method of claim 1, wherein the graphene nanoflakes are at least one of single-layer graphene, few-layer graphene, graphene nanoplatelets, graphene oxide, and expanded graphite oxide.

16. The coating method of claim 1, wherein the graphene nanoflakes have lateral sizes in the range of about 20 nm to about 50 µm.

17. The coating method of claim 1, wherein the graphene nanoflakes further comprise carbon material selected from among carbon black, carbon fibers, carbon nanofibers, and carbon nanotubes; and
    wherein the carbon material is added at a weight ratio relative to the graphene nanoflakes of about 1,000 to about 0.01.

18. The coating method of claim 1, wherein the polymer particles can include particles of a thermoplastic polymer selected from a group consisting of polyethylene, polypropylene, polyolefin, ABS, poly(meth)acrylates, polystyrene, polyamides, polyester, polycarbonate, polyurethane, polyimides, polysulfones, poly(aryl ether ketone)s, fluorinated polymers, and combinations-thereof.

19. The coating method of claim 18, wherein the polymer particles can be at least one of irregular, spherical, square, and columnar in shape.

20. The coating method of claim 18, wherein the polymer particles have an average dimension in the range of about 0.5 µm to about 1 mm.

21. The coating method of claim 18, where the polymer particles are at least one of round pellets, ellipsoidal pellets, columnar pellets, short fibers, and long fibers.

22. The coating method of claim 18, wherein the polymer particles are pre-mixed with a high boiling point liquid coating agent selected from a group consisting of ester plasticizers and mineral oils.

23. The coating method of claim 22, wherein the high boiling point liquid can be mixed with the polymer particles at a ratio of about 0.05 to about 5% by weight relative to the weight of the polymer particles.

24. The coating method of claim 1, wherein the grounded spraying bed comprises at least one of a metal mesh and a metal plate.

25. The coating method of claim 24, wherein the grounded spraying bed is positioned on a mechanical shaker to allow effective and uniform coating of graphene on the polymer particles.

26. The coating method of claim 24, wherein the grounded spraying bed is positioned in a container equipped with a mechanical stirrer.

27. The coating method of claim 1, wherein the graphene nanoflakes are fed to the spray nozzle, the spray nozzle being charged at a voltage of between about 500 V and about 20,000 V.

28. The coating method of claim 1, wherein the graphene nanoflakes are fed to the spray nozzle in dry powder form using a pressurized nitrogen system.

29. The coating method of claim 1, wherein the spray nozzle is positioned at a distance of between about 5 cm and about 50 cm from the polymer particles.

* * * * *